US006983049B2

(12) United States Patent
Wee et al.

(10) Patent No.: US 6,983,049 B2
(45) Date of Patent: Jan. 3, 2006

(54) STORAGE DEVICES FOR SECURE SCALABLE DATA STREAMING

(75) Inventors: Susie J. Wee, San Carlos, CA (US); John G. Apostolopoulos, San Carlos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 878 days.

(21) Appl. No.: 09/972,083

(22) Filed: Oct. 4, 2001

(65) Prior Publication Data

US 2003/0070081 A1    Apr. 10, 2003

Related U.S. Application Data

(63) Continuation-in-part of application No. 09/849,794, filed on May 4, 2001.

(51) Int. Cl.
*H04N 7/167* (2006.01)
*H04L 9/00* (2006.01)
(52) U.S. Cl. .................. 380/200; 380/212; 713/160
(58) Field of Classification Search ............ 380/200, 380/212, 217, 269, 42, 37; 713/150, 160, 713/189, 193, 200–201, 163; 709/200; 725/105
See application file for complete search history.

(56) References Cited

U.S. PATENT DOCUMENTS 6,275,531 B1    8/2001    Li

FOREIGN PATENT DOCUMENTS

WO    WO00/03525    1/2000
WO    WO00/31964    6/2000

OTHER PUBLICATIONS

Susie J. Wee and John G. Apostolopoulos, Secure Scalable Video Streaming for Wireless Networks, Streaming Meida Systems Group, Hew lett-Packard Laboratories, Palo Alto, CA, USA.

*Primary Examiner*—Hosuk Song

(57) ABSTRACT

A method and system for storing data streamed over a network. Scalably encoded and progressively encrypted data are received by a second device from a first device. The scalably encoded and progressively encrypted data are stored by the second device. The scalably encoded and progressively encrypted data can be subsequently streamed to a device in the network for additional processing.

13 Claims, 44 Drawing Sheets

STORAGE DEVICES FOR SECURE SCALABLE DATA STREAMING

CROSS REFERENCE TO RELATED APPLICATION

This Application is a Continuation-in-Part of the co-pending, commonly-owned U.S. patent application Ser. No. 09/849,794, filed May 4, 2001, by S. J. Wee et al., and entitled "Encoding and Decoding Methods for Secure Scalable Streaming and Related Systems."

TECHNICAL FIELD

The present claimed invention relates to the field of streaming media data, particularly scalably encoded and progressively encrypted data. More specifically, the present claimed invention relates to the storage of such data.

BACKGROUND ART

Wireless streaming environments present many challenges for the system designer. For instance, clients can have different display, power, communication, and computational capabilities. In addition, wireless communication links can have different maximum bandwidths, quality levels, and time-varying characteristics. A successful wireless video streaming system must be able to stream video to heterogeneous clients over time-varying wireless communication links, and this streaming must be performed in a scalable and secure manner. Scalability is needed to enable streaming to a multitude of clients with different device capabilities. Security is particularly important in wireless networks to protect content from eavesdroppers.

In order to achieve scalability and efficiency in wireless streaming environments, one must be able to easily adapt or transcode the compressed video stream at intermediate network nodes. A transcoder takes a compressed video system as the input, then processes it to produce another compressed video stream as the output. Sample transcoding operations include bitrate reduction, rate shaping, spatial downsampling, frame rate reduction, and changing compression formats. Network transcoding can improve system scalability and efficiency, for example, by adapting the spatial resolution of a video stream for a particular client's display capabilities or by dynamically adjusting the bitrate of a video stream to match a wireless channel's time-varying characteristics.

While network transcoding facilitates scalability in video streaming systems, it also presents a number of challenges. First, while computationally efficient transcoding algorithms have been developed, even these are not well-suited for processing hundreds or thousands of streams at intermediate wired network nodes or even a few streams at intermediate low-power wireless networking relay nodes. Furthermore, network transcoding poses a serious threat to the security of the streaming system because conventional transcoding operations performed on encrypted streams generally require decrypting the stream, transcoding the decrypted stream, and then re-encrypting the result. Because every transcoder must decrypt the stream, each network transcoding node presents a possible breach in the security of the entire system.

More specifically, in conventional video streaming approaches employing application-level encryption, video is first encoded into a bitstream using interframe compression algorithms. These algorithms include, for example, the Moving Picture Experts Group (MPEG) standard, the International Telecommunications Union (ITU) standard, H.263, or intraframe compression algorithms such as, for example, the Joint Photographic Experts Group (JPEG) or JPEG2000 standards. The resulting bitstream is then encrypted, and the resulting encrypted stream is packetized and transmitted over the network using a transport protocol such as user datagram protocol (UDP). Prior Art FIG. 1 is a block diagram 100 which illustrates the order in which conventional application-level encryption is performed (e.g., Encode 102, Encrypt 104, and Packetize 106). One difficulty with this conventional approach arises when a packet is lost. Specifically, error recovery is difficult because without the data from the lost packet, decryption and/or decoding may be difficult if not impossible.

Prior Art FIG. 2 is a block diagram 200 illustrating another conventional secure video streaming system that uses network-level encryption (e.g., Encode 202, Packetize 204, and Encrypt 206). The system of Prior Art FIG. 2 can use the same video compression algorithms as the system of Prior Art FIG. 1. However, in the system of Prior Art FIG. 2, the packetization can be performed in a manner that considers the content of the coded video and thus results in better error recovery, a concept known to the networking community as application-level framing. For example, a common approach is to use MPEG compression with the real-time transport protocol (RTP) which is built on UDP. RTP provides streaming parameters such as time stamps, and suggests methods for packetizing MPEG payload data to ease error recovery in the case of lost or delayed packets. However, error recovery is still difficult and, without data from a lost packet, decryption and/or decoding is still difficult if not impossible.

Both of the conventional approaches of Prior Art FIG. 1 and Prior Art FIG. 2 are secure in that they transport the video data in encrypted form. However, with these conventional approaches, if network transcoding is needed, it must be performed in accordance with the method of Prior Art FIG. 3. That is, as shown in block diagram 300, the necessary transcoding operation is a decrypt 302, decode 304, process 306, re-encode 308, and re-encrypt 310 process. As shown in the block diagram 400 of Prior Art FIG. 4, in another conventional approach, the computational requirements of the operation of Prior Art FIG. 3 are reduced to a decrypt 402, transcode 404, and re-encrypt 406 process. Specifically, this computational reduction is achieved by incorporating an efficient transcoding algorithm (e.g., transcode module 404) in place of the decode 304, process 306, and re-encode 308 modules of Prior Art FIG. 3. However, even such improved conventional transcoding algorithms have computational requirements that are not well-suited for transcoding many streams in a network node. Furthermore, a more critical drawback stems from the basic need to decrypt the stream for every transcoding operation. As mentioned above, each time the stream is decrypted, it opens another possible attack point and thus increases the vulnerability of the system. Thus, each transcoder further threatens the security of the overall system.

As yet another concern, wireless streaming systems are limited by wireless bandwidth and client resources. Wireless bandwidth is scarce because of its shared nature and the fundamental limitations of the wireless spectrum. Client resources are often practically limited by power constraints and by display, communication, and computational capabilities. As an example, wireless transmission and even wireless reception alone typically consume large power budgets. In order to make the most efficient use of wireless bandwidth and client resources, it is desirable to send clients the lowest bandwidth video streams that match their display and communication capabilities. In wireless streaming systems where a sender streams video to a number of heterogeneous clients with different resources, network transcoders can be used to help achieve end-to-end system efficiency and scalability.

In hybrid wired/wireless networks, it is often necessary to simultaneously stream video to fixed clients on a wired network and to mobile clients on a wireless network. In such a hybrid system, it may often be desirable to send a full-bandwidth, high-resolution video stream to the fixed wired client, and a lower-bandwidth, medium-resolution video stream to the mobile wireless receiver. Conventional video streaming approaches, however, do not achieve the efficiency, security, and scalability necessary to readily accommodate the video streaming corresponding to hybrid wired/wireless networks.

Yet another example of the drawbacks associated with conventional video streaming approaches is demonstrated in conjunction with wireless appliance networks. In many wireless appliance networks, mobile senders and receivers communicate with one another over wireless links. A sender's coverage area is limited by the power of the transmitted signal. Relay devices can be used to extend the wireless coverage area when intended receivers are beyond the immediate coverage area of the sender. However, in the case of heterogeneous clients within the same wireless network, it may be desired to provide a higher bandwidth, high-resolution video stream to the high power wireless receivers, and a lower bandwidth, low-resolution video stream to the low power wireless receivers. Once again, conventional video streaming approaches do not achieve the efficiency, security, and scalability necessary to readily accommodate such video streaming demands in wireless appliance networks.

Although the above-listed discussion specifically mentions the shortcomings of prior art approaches with respect to the streaming of video data, such shortcomings are not limited solely to the streaming of video data. Instead, the problems of the prior art span various types of media including, but not limited to, audio-based data, image-based data, graphic data, web page-based data, and the like.

Accordingly, what is needed is a method and/or system that can allow media data to be streamed in a secure and computationally efficient manner. What is also needed is a method and/or system that can satisfy the above need and that can also allow media data to be streamed to heterogeneous clients ("receiving nodes") that may have different display, power, communication and computational capabilities and characteristics. The present invention provides a novel solution to these needs.

DISCLOSURE OF THE INVENTION

The present invention provides, in one embodiment, a secure and computationally efficient method and system allowing media data to be streamed to a variety of receiving nodes having different capabilities and characteristics. In another embodiment, the present invention provides a secure and computationally efficient method and system for allowing media data to be streamed according to attributes of the communication channel. These and other technical advantages of the present invention will no doubt become obvious to those of ordinary skill in the art after having read the following detailed description of the preferred embodiments that are illustrated in the various drawing figures.

The present invention pertains to devices and methods thereof for processing and storing scalably encoded and progressively encrypted data streamed in a network. The data can be any type of media data including video data, audio data, image data, graphic data, and web page data.

In the present embodiment, scalably encoded and progressively encrypted data are received by a second device from a first device. The scalably encoded and progressively encrypted data are stored by the second device. The scalably encoded and progressively encrypted data can be subsequently streamed to a device in the network for additional processing.

In one embodiment, the first device includes a segmenter adapted to receive data from a source and segment at least a portion of the data into regions, a scalable encoder adapted to scalably encode at least one of the regions into scalably encoded data, and a progressive encrypter adapted to progressively encrypt at least a portion of the scalably encoded data into progressively encrypted scalably encoded data.

In another embodiment, the first device also includes a packetizer adapted to packetize at least a portion of the progressively encrypted and scalably encoded data into secure and scalable data packets. In this embodiment, the second device stores secure and scalable data packets received from the first device. In yet another embodiment, packetization of the progressively encrypted scalably encoded data is performed at a third device downstream of the second device. In that embodiment, the third device provides the secure and scalable data packets to another device for storage (e.g., either the second device or some other device).

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART FIG. 1 a block diagram which illustrates the order in which conventional application-level encryption is performed.

PRIOR ART

PRIOR ART

PRIOR ART

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "segmenting," "encoding," "encrypting," "storing," "sending," "generating," "providing," "packetizing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present
Secure Scalable Streaming Invention

Figure 1:
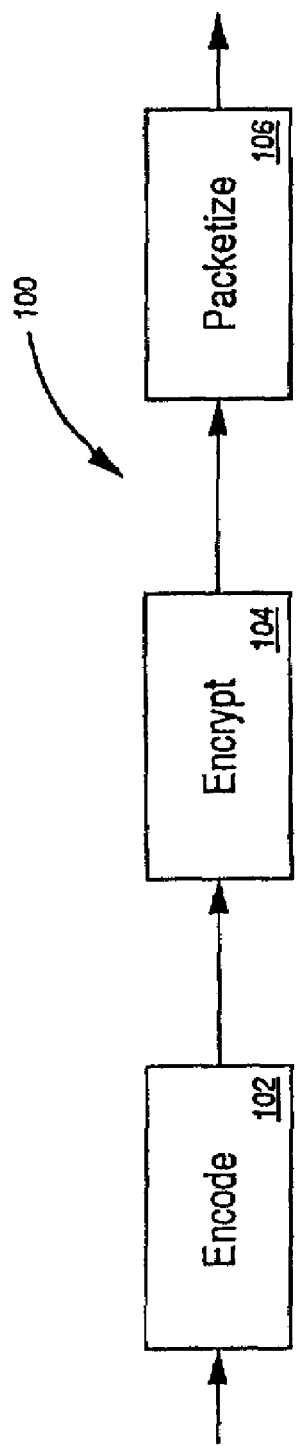
Figure 2:
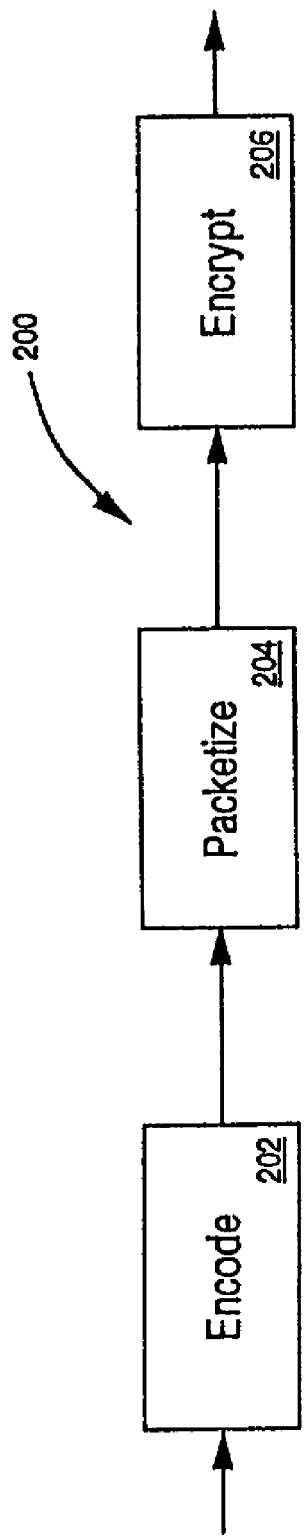
FIG. 2 is a block diagram which illustrates another conventional secure streaming system using network-level encryption.
Figure 3:
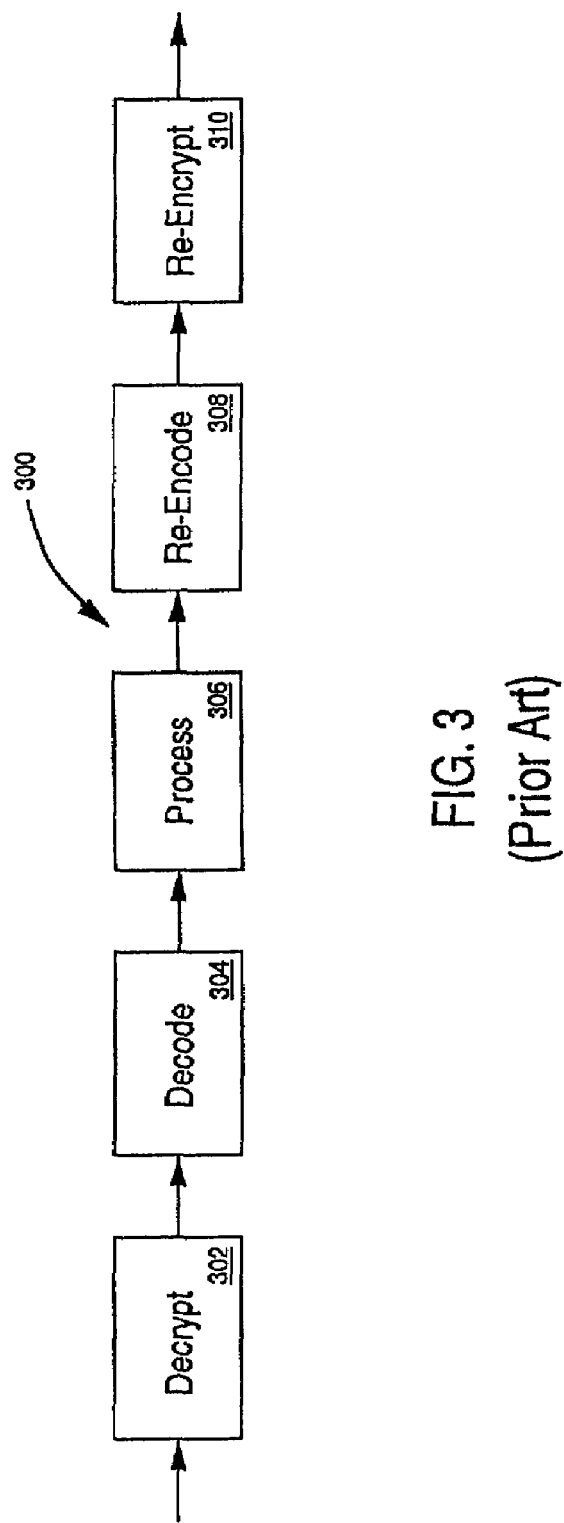
FIG. 3 is block diagram illustrating a conventional transcoding method.
Figure 4:
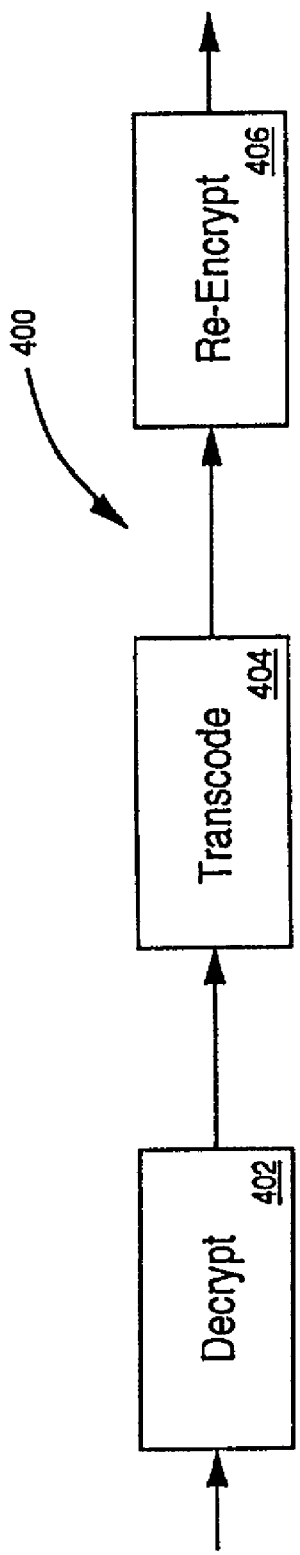
FIG. 4 is block diagram illustrating another conventional transcoding method.
Figure 5:
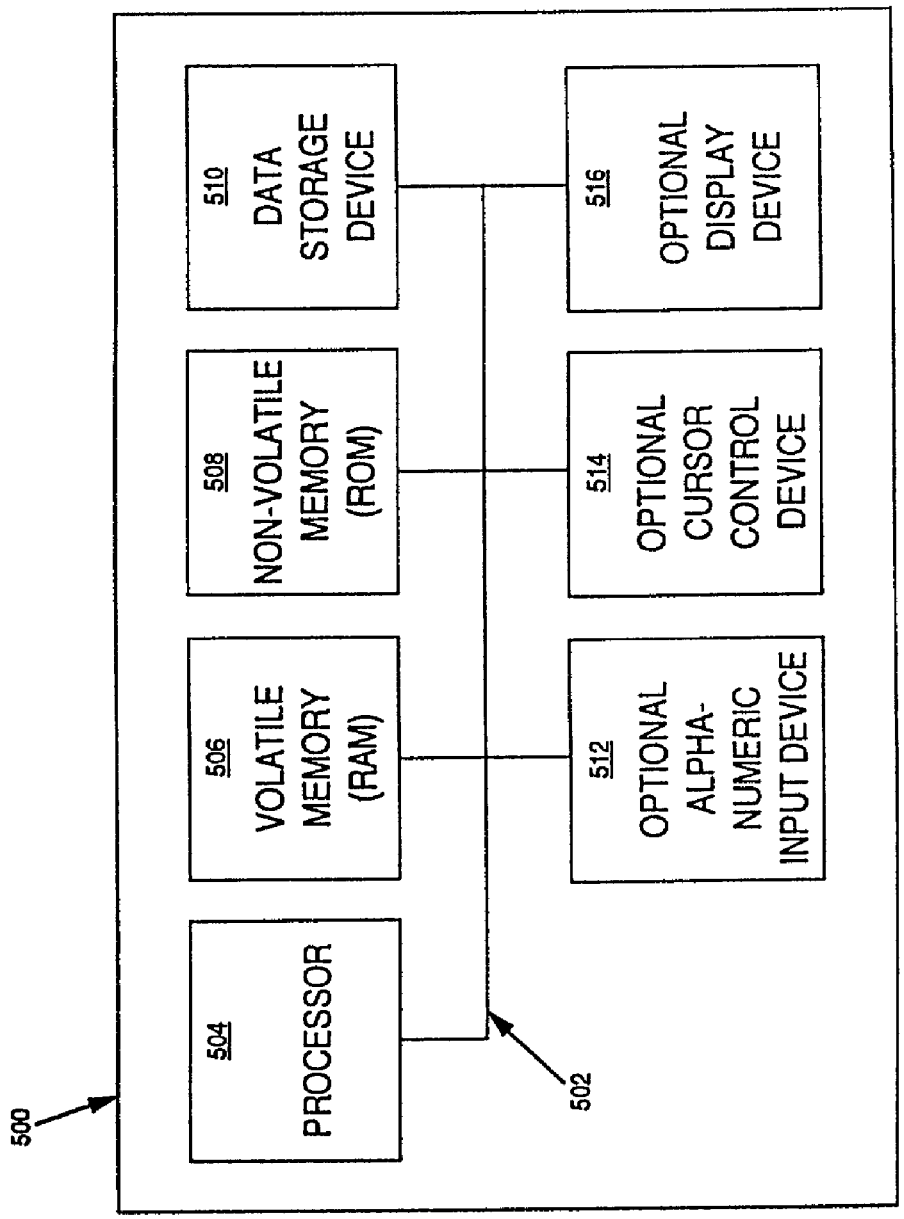
FIG. 5 is a schematic diagram of an exemplary computer system used to perform steps of the present method in accordance with various embodiments of the present claimed invention.

With reference now to FIG. 5, portions of the present invention method and system are comprised of computer-readable and computer-executable instructions which reside, for example, in computer-usable media of a computer system. FIG. 5 illustrates an exemplary computer system 500 used in accordance with one embodiment of the present secure scalable streaming invention. It is appreciated that system 500 of FIG. 5 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 500 of FIG. 5 is well adapted to having computer readable media such as a floppy disk, a compact disc, and the like coupled thereto. Such computer readable media are not shown coupled to computer system 500 in FIG. 5 for purposes of clarity.

System 500 of FIG. 5 includes an address/data bus 502 for communicating information, and a central processor unit 504 coupled to bus 502 for processing information and instructions. System 500 also includes data storage features such as a computer usable volatile memory 506, e.g. random access memory (RAM), coupled to bus 502 for storing information and instructions for central processor unit 504, computer usable non-volatile memory 508 (e.g. read only memory, ROM) coupled to bus 502 for storing static information and instructions for the central processor unit 504, and a data storage unit 510 (e.g., a magnetic or optical disk and disk drive) coupled to bus 502 for storing information and instructions. System 500 of the present invention also includes an optional alphanumeric input device 512 including alphanumeric and function keys coupled to bus 502 for communicating information and command selections to central processor unit 504. System 500 also optionally includes an optional cursor control device 514 coupled to bus 502 for communicating user input information and command selections to central processor unit 504. System 500 of the present embodiment also includes an optional display device 516 coupled to bus 502 for displaying information.

Referring still to FIG. 5, optional display device 516 may be a liquid crystal device, cathode ray tube, or other display device suitable for creating graphic images and alphanumeric characters recognizable to a user. Optional cursor control device 514 allows the computer user to dynamically signal the two dimensional movement of a visible symbol (cursor) on a display screen of display device 516. Many implementations of cursor control device 514 are known in the art including a trackball, mouse, touch pad, joystick or special keys on alphanumeric input device 512 capable of signaling movement of a given direction or manner of displacement. Alternatively, it will be appreciated that a cursor can be directed and/or activated via input from alphanumeric input device 512 using special keys and key sequence commands. The present invention is also well suited to directing a cursor by other means such as, for example, voice commands. A more detailed discussion of the present secure scalable streaming invention is found below.

General Description of the Present Secure Scalable Streaming Invention

Figure 6:
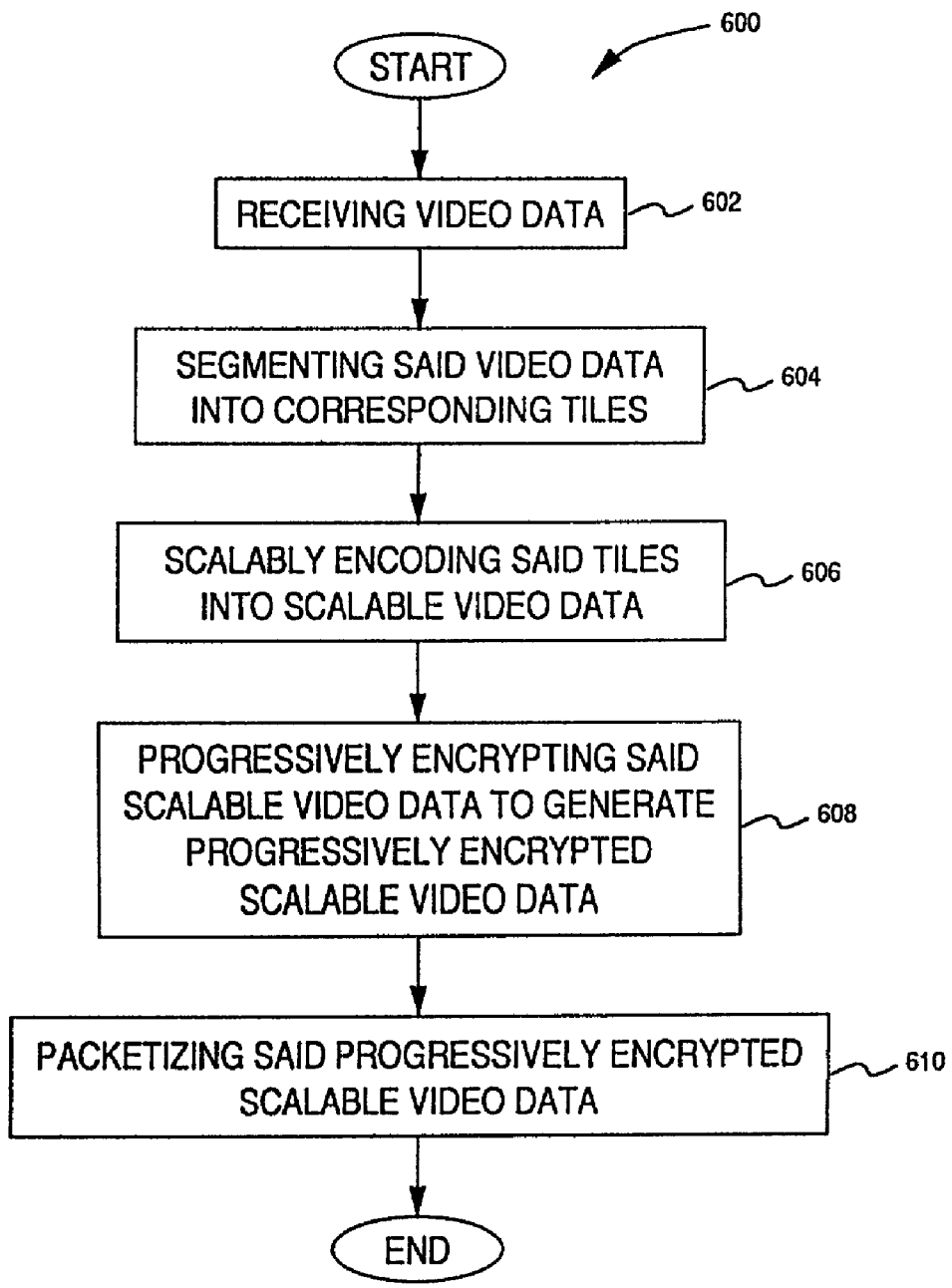
FIG. 6 is a flowchart of steps performed in a secure and scalable encoding method in accordance with one embodiment of the present claimed invention.
Figure 11:
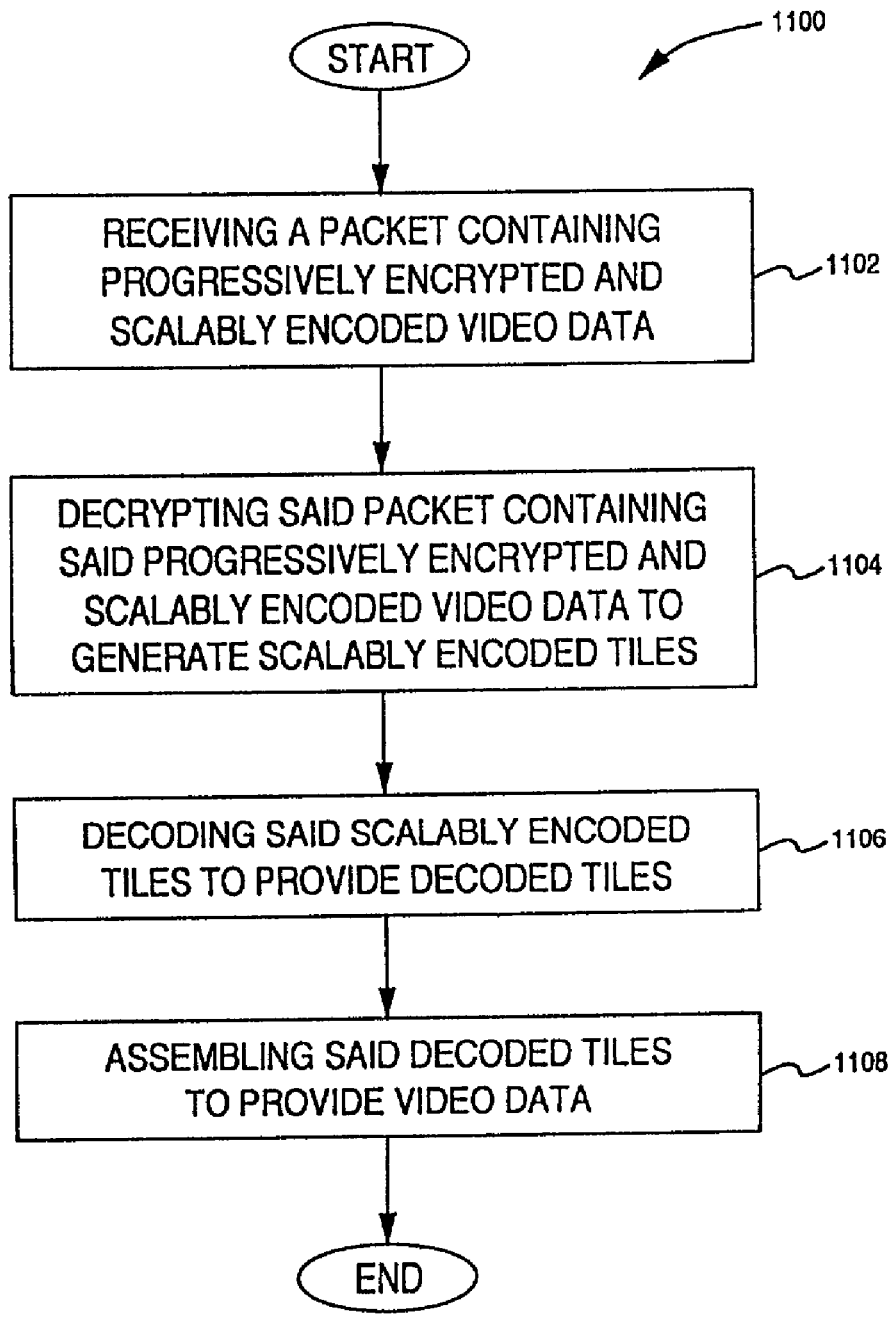
FIG. 11 is a flowchart of a process for decoding data which has been securely and scalably encoded in accordance with one embodiment of the present claimed invention.
Figure 19:
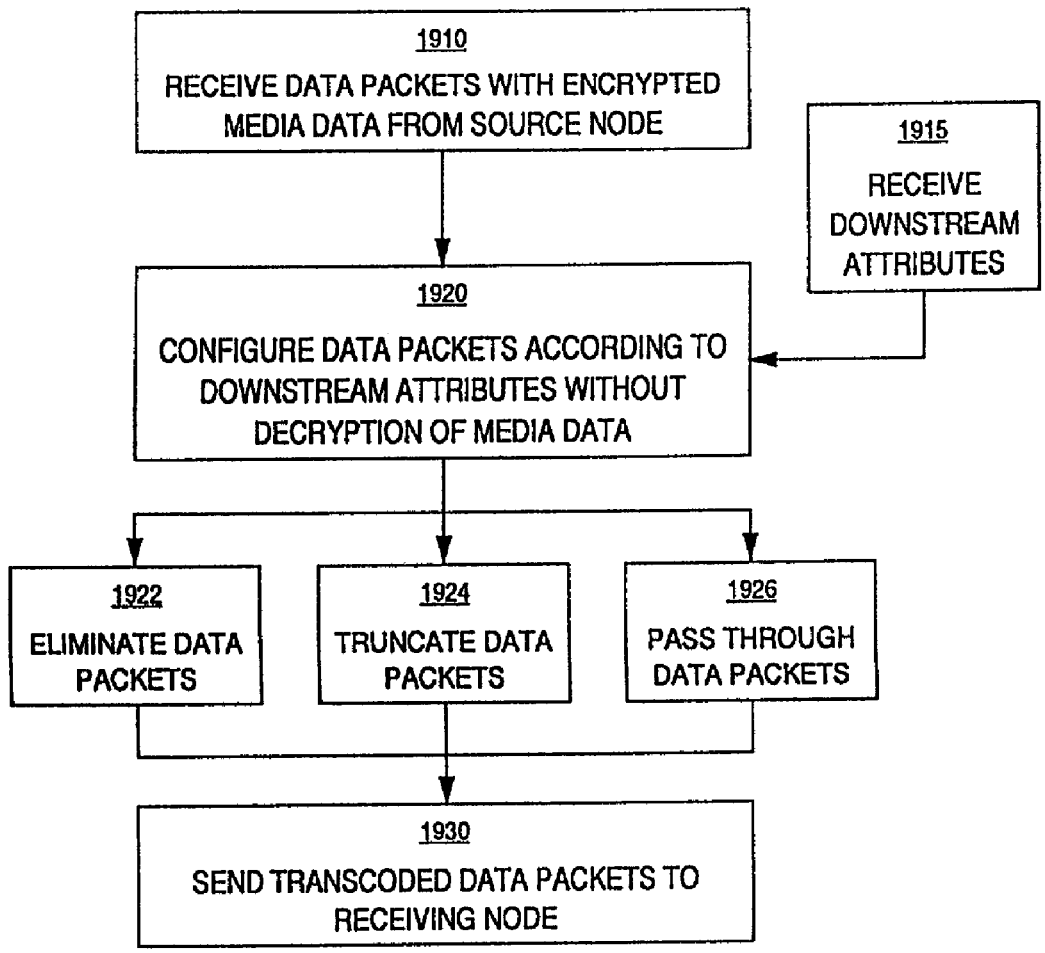
FIG. 19 is a flowchart of a process for transcoding data packets in accordance with one embodiment of the present claimed invention.

With reference next to FIG. 6, FIG. 11, and FIG. 19, flowcharts 600, 1100 and 1900, respectively, illustrate exemplary steps used by the various embodiments of the present invention. Flowcharts 600, 1100 and 1900 include processes of the present invention which, in one embodiment, are carried out by a processor under the control of computer-readable and computer-executable instructions. The computer-readable and computer-executable instructions reside, for example, in data storage features such as computer usable volatile memory 506, computer usable non-volatile memory 508, and/or data storage device 510 of FIG. 5. The computer-readable and computer-executable instructions are used to control or operate in conjunction with, for example, central processing unit 504 of FIG. 5.

As an overview, the present invention is directed towards any data which can be scalably encoded and, specifically, any data that combine scalable encoding with progressive encryption. For purposes of the present application, scalable coding is defined as a process which takes original data as input and creates scalably coded data as output, where the scalably coded data have the property that portions of it can be used to reconstruct the original data with various quality levels. Specifically, the scalably coded data are often thought of as an embedded bitstream. The first portion of the bitstream can be used to decode a baseline-quality reconstruction of the original data, without requiring any information from the remainder of the bitstream, and progressively larger portions of the bitstream can be used to decode improved reconstructions of the original data. For purposes of the present application, progressive encryption is defined as a process which takes original data (plain text) as input and creates progressively encrypted data (cipher text) as output, where the progressively encrypted data have the property that the first portion can be decrypted alone, without requiring information from the remainder of the original data; and progressively larger portions can be decrypted with this same property, in which decryption can require data from earlier but not later portions of the bitstream.

Encoding Method and System

Although specific steps are disclosed in flowchart 600 of FIG. 6, such steps are exemplary. That is, the present invention is well suited to performing various other steps or variations of the steps recited in FIG. 6. Additionally, for purposes of clarity and brevity, the following discussion and examples will specifically deal with video data. The present invention, however, is not limited solely to use with video data. Instead, the present invention is well suited to use with audio-based data, image-based data, web page-based data, graphic data and the like ("media data"). Specifically, the present invention is directed towards any data in which scalable coding is combined with progressive encryption. In step 602 of FIG. 6, in one embodiment, the present invention recites receiving video data. In one embodiment, the video data are comprised of a stream of uncompressed video frames which are received by segmenter 702 of the encoder system 700 of FIG. 7.

Figure 8:
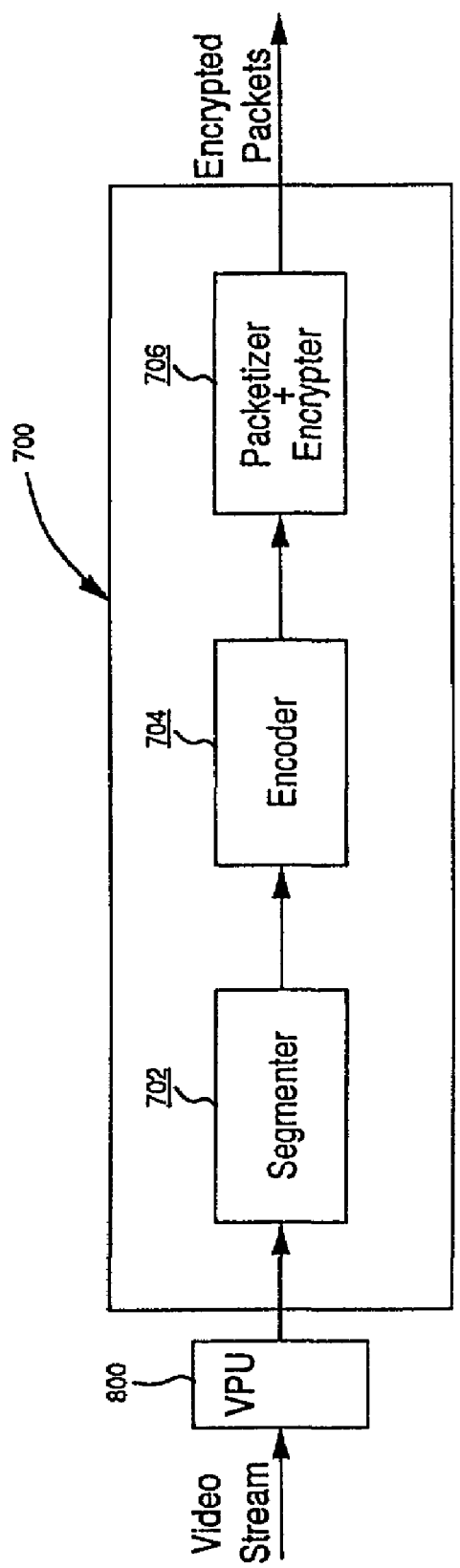
FIG. 8 is a block diagram of an encoding system having a video prediction unit coupled thereto in accordance with one embodiment of the present claimed invention.
Figure 9:
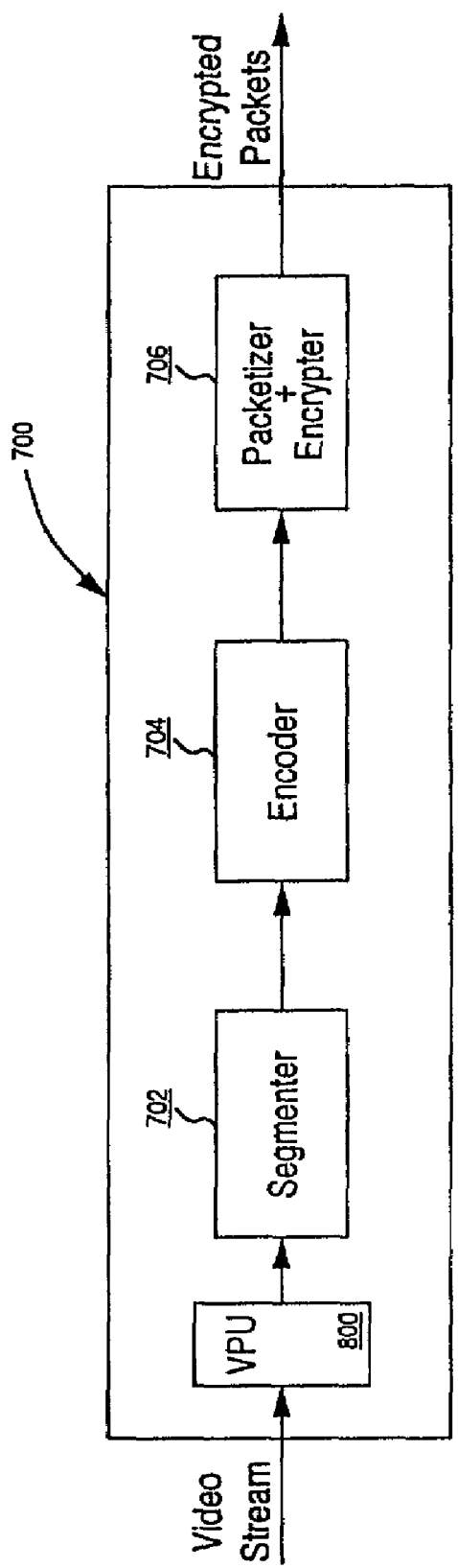
FIG. 9 is a block diagram of an encoding system having a video prediction unit integral therewith in accordance with one embodiment of the present claimed invention.

In another embodiment of the present invention, the video data are comprised of prediction error video data generated by a video prediction unit (VPU). As shown FIG. 8, in one embodiment of the present invention encoder system 700 has a VPU 800 coupled thereto. VPU 800 generates and forwards prediction error video data to segmenter 702 of encoder system 700. Although VPU 800 of FIG. 8 is disposed outside of encoding system 700, the present invention is also well suited to having VPU 800 integral with encoding system 700. FIG. 9 illustrates one embodiment of the present invention in which VPU 800 is integral with encoding system 700.

Figure 10A:
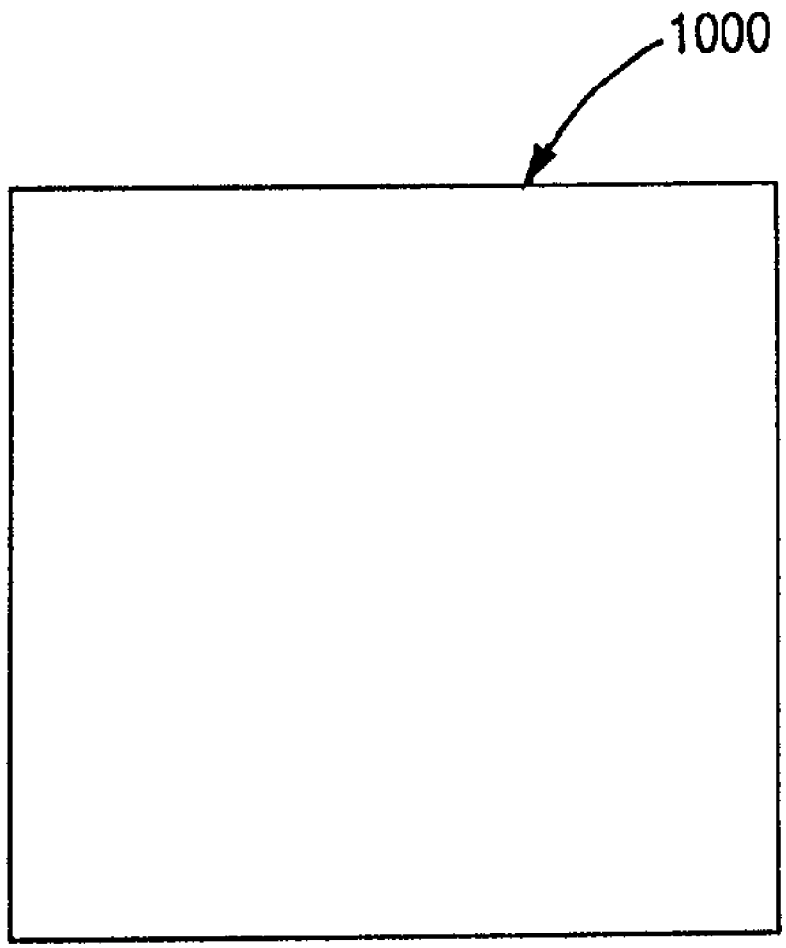
FIG. 10A is a schematic depiction of a frame of video data in accordance with one embodiment of the present claimed invention.
Figure 10B:
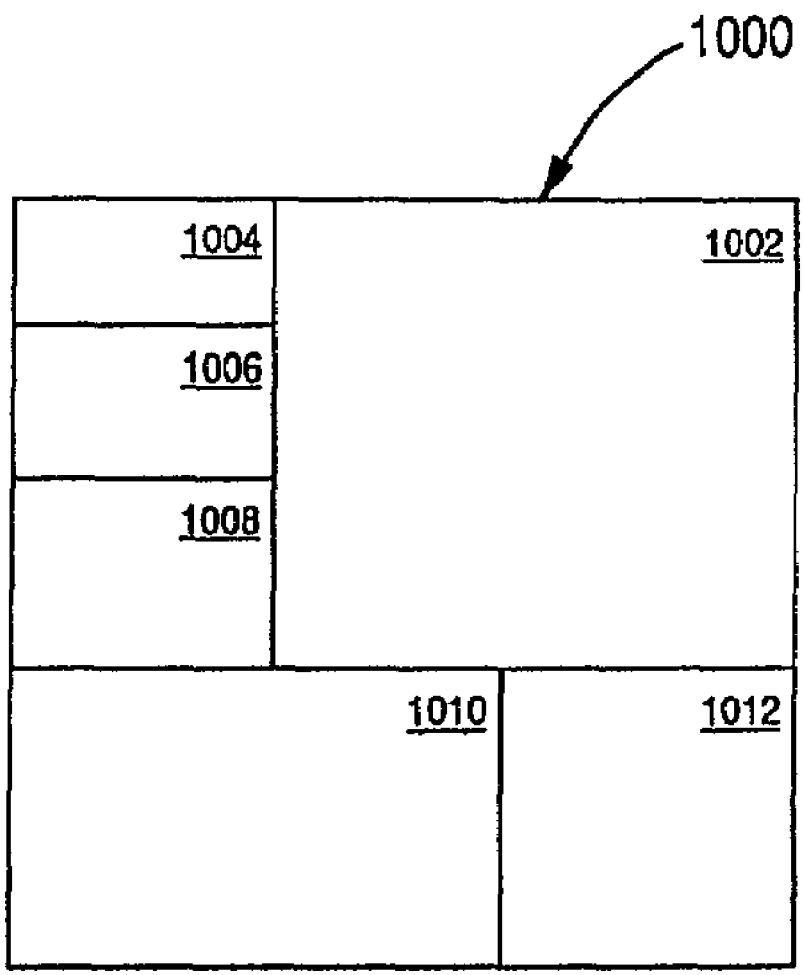
FIG. 10B is a schematic depiction of the frame of video data of FIG. 10A after segmentation into corresponding regions in accordance with one embodiment of the present claimed invention.
Figure 10C:
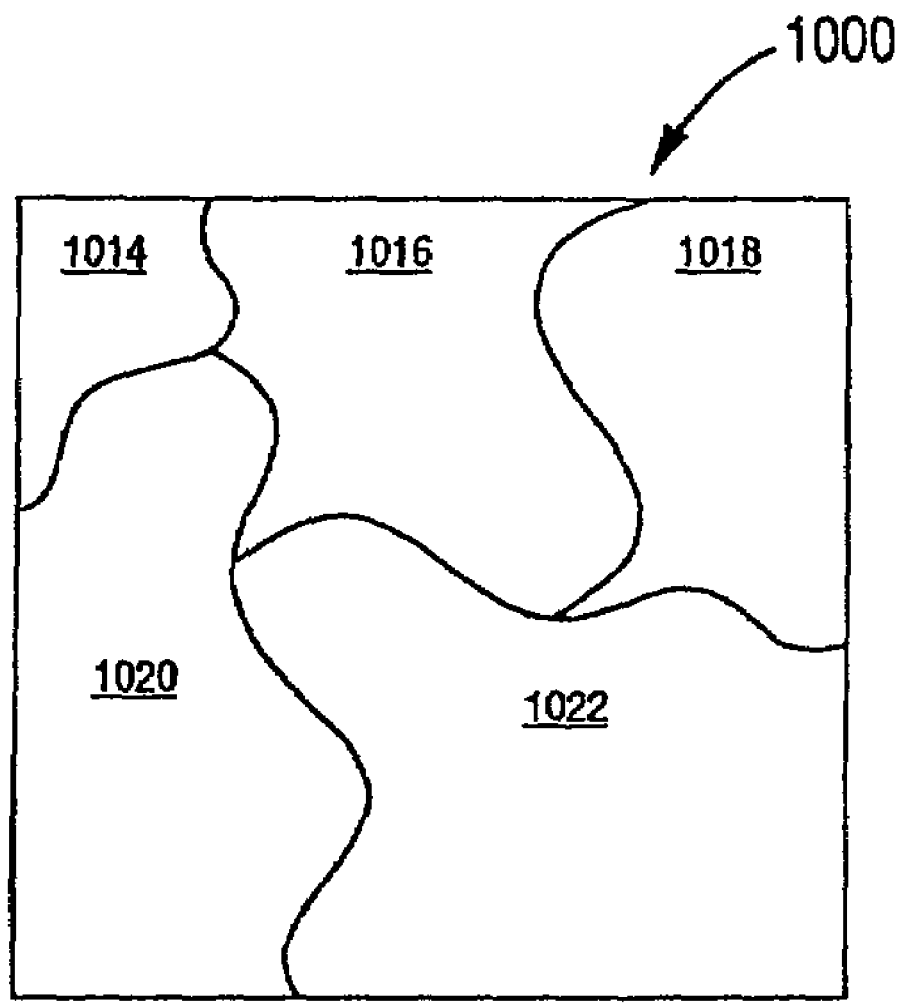
FIG. 10C is a schematic depiction of the frame of video data of FIG. 10A after segmentation into corresponding non-rectangular regions in accordance with one embodiment of the present claimed invention.
Figure 10D:
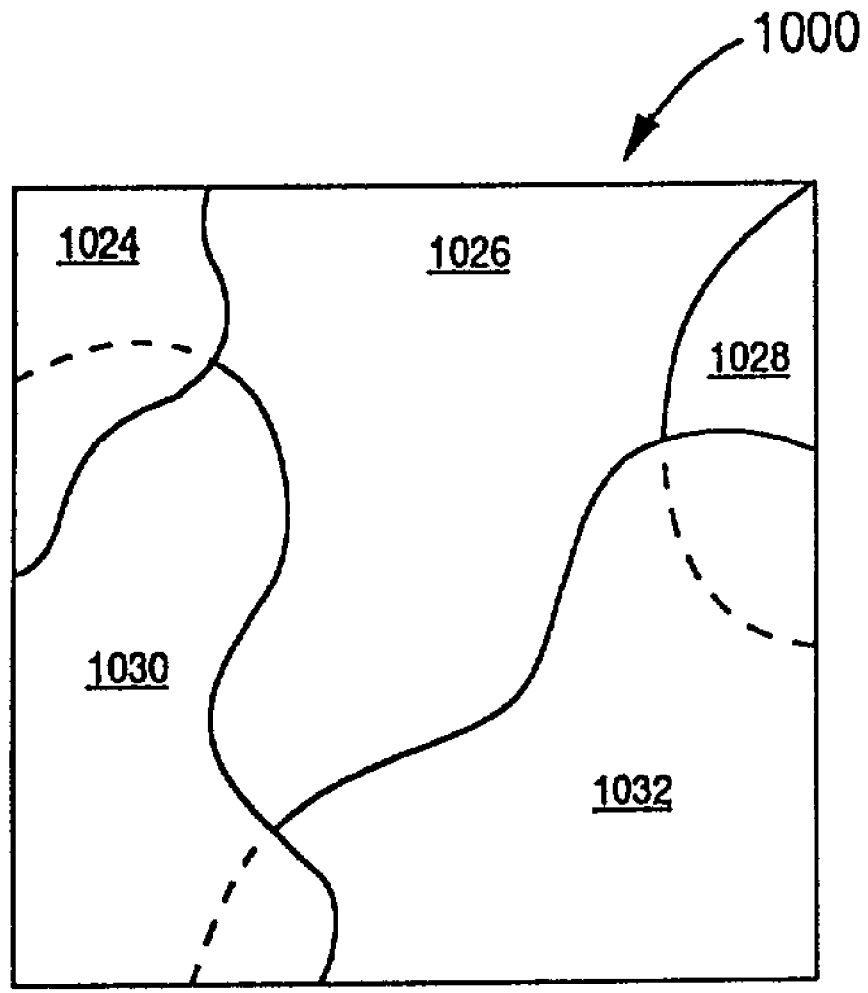
FIG. 10D is a schematic depiction of the frame of video data of FIG. 10A after segmentation into corresponding overlapping non-rectangular regions in accordance with one embodiment of the present claimed invention.

With reference now to step 604 of FIG. 6, the present embodiment of the present invention then segments the received video data into corresponding regions. FIG. 10A provides a schematic depiction of a video frame 1000. Video data corresponding to video frame 1000 are received by segmenter 702 of FIGS. 7, 8, and 9. FIG. 10B depicts the same video frame 1000 after segmenter 702 has segmented video frame 1000 into corresponding regions 1002, 1004, 1006, 1008, 1010, and 1012. Although such a quantity and configuration of regions is shown in FIG. 10B, such a tiling quantity and configuration is intended to be exemplary only. As one example, FIG. 10C illustrates another example of segmentation in which segmenter 702 has segmented video frame 100 into various non-rectangular regions 1014, 1016, 1018, 1020, and 1022. As another example, FIG. 10D illustrates another example of segmentation in which segmenter 702 has segmented video frame 100 into various non-rectangular and overlapping regions 1024, 1026, 1028, 1030, and 1032. The overlapping portions are denoted by dotted lines. The present invention is also well suited to an approach in which segmenter 702 has various rectangular regions configured in an overlapping arrangement. Furthermore, the present invention is also well suited to an embodiment in which the regions change from frame to frame. Such an embodiment is employed, for example, to track a foreground person as they move.

Figure 7:
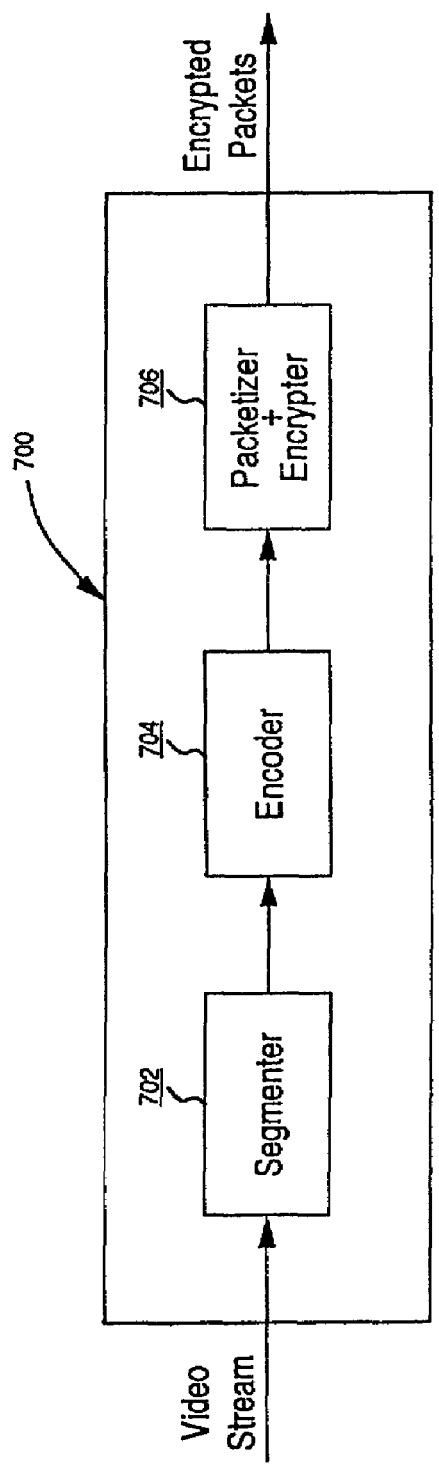
FIG. 7 is a block diagram of an encoding system in accordance with one embodiment of the present claimed invention.

Referring now to step 606, encoder 704 of FIGS. 7, 8 and 9 then scalably encodes the regions into scalable video data. For purposes of the present application, scalable coding is defined as a process which takes original data as input and creates scalably coded data as output, where the scalably coded data have the property that portions of it can be used to reconstruct the original data with various quality levels. Specifically, the scalably coded data are often thought of as an embedded bitstream. The first portion of the bitstream can be used to decode a baseline-quality reconstruction of the original data, without requiring any information from the remainder of the bitstream, and progressively larger portions of the bitstream can be used to decode improved reconstructions of the original data. That is, a separate region or regions of a video frame are encoded into one or more data packets. The scalable video data generated by the present embodiment have the property that a first small portion of the data can be decoded into baseline quality video, and larger portions can be decoded into improved quality video. It is this property that allows data packets to be transcoded to lower bitrates or spatial resolutions simply by truncating the data packet. This process of truncation will be discussed in further detail below.

With reference still to step 606, in one embodiment of the present invention, each region is coded by encoder 704 into two portions: header data and scalable video data. Hence, in such an embodiment, each data packet contains header data and scalable video data. The header data describe, for example, the region (e.g., the location of the region within the video frame) that the data packet represents and other information used for subsequent transcoding and decoding operations in accordance with the present invention. Furthermore, in one embodiment, the header data contain information including a series of recommended truncation points for data packet transcoders. The scalable video data contain the actual coded video. In the case of intraframe coding, the video data may be the coded pixels; while in the case of interframe coding, it may be the motion vectors and coded residuals that result from motion-compensated prediction. In the present embodiments, scalable coding techniques are used in both cases to create an embedded or scalable data packet that can be truncated to lower the resolution or fidelity of the coded video data. In still another embodiment of the present invention, the scalably encoded video data are prepared by encoder 704 without corresponding header data.

As recited in step 608, the present embodiment then progressively encrypts the scalable video data to generate progressively encrypted scalable video data. That is, packetizer and encrypter 706 of FIGS. 7, 8, and 9 employ progressive encryption techniques to encrypt the scalable video data. For purposes of the present application, progressive encryption is defined as a process which takes original data (plain text) as input and creates progressively encrypted data (cipher text) as output, where the progressively encrypted data have the property that the first portion can be decrypted alone, without requiring information from the remainder of the original data; and progressively larger portions can be decrypted with this same property, in which decryption can require data from earlier but not later portions of the bitstream. Progressive encryption techniques include, for example, cipher block chains or stream ciphers. These progressive encryption methods have the property that the first portion of the data is encrypted independently, then later portions are encrypted based on earlier portions. When properly matched with scalable coding and packetization, progressive encryption preserves the ability to transcode data packets with simple data packet truncation. More specifically, progressive encryption methods have the property that smaller blocks of data are encrypted progressively. While block code encryption with small block sizes is not very secure, progressive encryption methods add a degree of security by feeding encrypted data of earlier blocks into the encryption of a later block. Decryption can then be performed progressively as well. In one embodiment, the first small block of cipher text is decrypted into plain text by itself while later blocks of cipher text depend on the decrypted plain text from earlier blocks. Thus, earlier blocks of cipher text can be decrypted without knowledge of the entire cipher text segment. This progressive nature of cipher block chains and stream ciphers matches nicely with the progressive or embedded nature of scalable coding. Although encoding system 700 depicts a combined packetizer and encrypter module 706, such a depiction is exemplary only, as encoding system 700 of the present invention is well suited to having separate and distinct packetizer and encrypter modules.

In prior art approaches, entire data packets were encrypted with one long block code. As a result, decryption was not possible unless the data packet was received in its entirety. However, the present invention is using scalable data packets and it is desired to transcode the stream of scalable data packets by data packet truncation. Therefore, the present invention encrypts the data packets in a similarly progressive manner. Hence, unlike conventional approaches, the present invention is data packet loss resilient. That is, should a data packet be lost, decryption of the remaining data packets is not further complicated and is still readily achievable. This combination of scalable encoding and progressive encryption enables the advantageous transcoding operations described in detail below.

With reference still to step 608, in one embodiment of the present invention, while the payload data (e.g., the scalable video data) are encrypted progressively, the header data are left unencrypted so that transcoding nodes can use this information to make transcoding decisions. For example, in one embodiment, the unencrypted header contains information such as recommended truncation points within the encrypted payload data. In another embodiment, these header data are used to achieve near rate distortion (RD)-optimal bitrate reduction by intermediate transcoding nodes. Moreover, in the present embodiment, the transcoding nodes can use the header data to make transcoding decisions without requiring decryption of the progressively encrypted scalable video data or the header data. In yet another embodiment of the present invention, the header data are encrypted to add additional security.

Referring now to step 610, the present invention then packetizes the progressively encrypted scalable video data. In one embodiment, a packetizer and encrypter 706 of FIGS. 7, 8, and 9 combines and packetizes the unencrypted header data with the progressively encrypted scalable video data. The resulting secure scalable data packets are then available to be streamed to desired receivers. In another embodiment, packetizer and encrypter 706 packetizes the progressively encrypted scalable video data and the encrypted header data. Furthermore, in an embodiment which does not include header data, packetizer and encrypter 706 packetizes only the progressively encrypted scalable video data.

Encoding system 700 securely and scalably encodes video data. More specifically, encoding system 700 combines scalable coding with progressive encryption techniques. The resulting scalably encoded, progressively encrypted, and packetized video streams have the feature that subsequent transcoding operations such as bitrate reduction and spatial downsampling can be performed (via data packet truncation or data packet elimination, for example) without decrypting the packetized data and thus while maintaining the security of the system. The present invention is also well suited to an embodiment in which only some, but not all, of the regions formed by segmenter 702 are ultimately forwarded from encoding system 700. As an example, in one embodiment, the foreground of a video data image is forwarded, as the background image may not have changed since a previous transmission, or perhaps the background image does not contain data of interest.

Decoding Method and System

Figure 12:
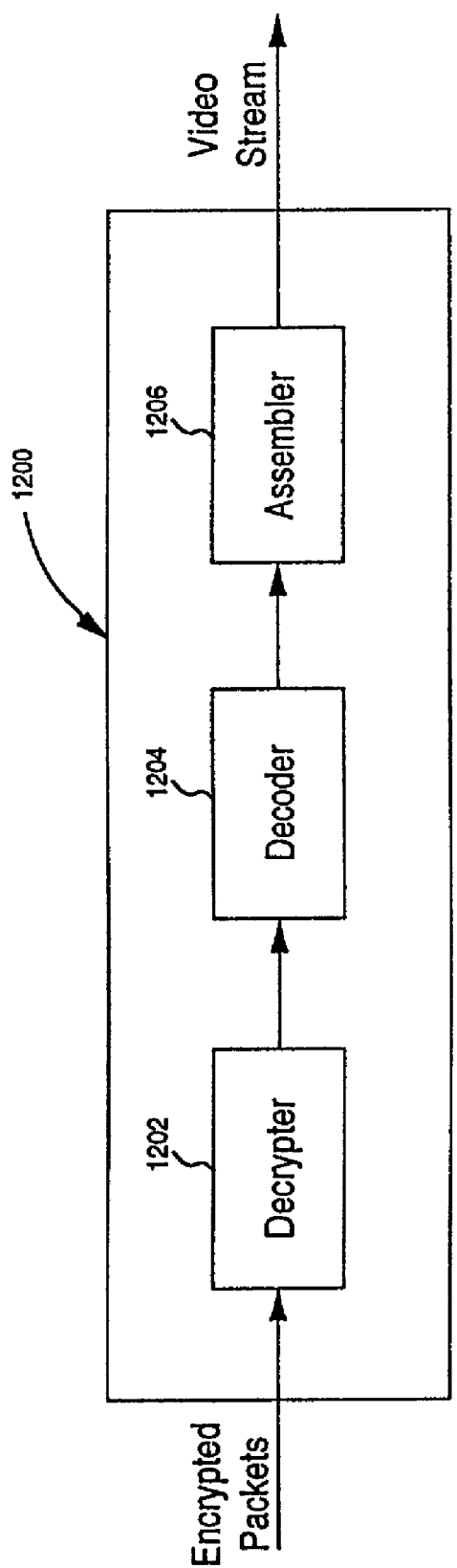
FIG. 12 is a block diagram of a decoding system in accordance with one embodiment of the present claimed invention.

Although specific steps are disclosed in flowchart 1100 of FIG. 11, such steps are exemplary. That is, the present invention is well suited to performing various other steps or variations of the steps recited in FIG. 11. In step 1102 of FIG. 11, the present invention receives a data packet containing progressively encrypted and scalably encoded video data. More specifically, decrypter 1202 of decoding system 1200 (FIG. 12) receives the data packet containing progressively encrypted and scalably encoded video data. In one embodiment, the received data packet also includes header data wherein the header data provide information corresponding to the scalably encoded video data. In yet another embodiment, the received data packet also includes encrypted header data providing information corresponding to the scalably encoded video data.

As recited in step 1104, the present invention then decrypts the data packet containing the progressively encrypted and scalably encoded video data to generate scalably encoded regions. That is, decrypter 1202 of FIG. 12 decrypts the progressively encrypted and scalably encoded video data to generate scalably encoded regions. Furthermore, in an embodiment in which the received data packet includes encrypted header data, decrypter 1202 also decrypts the encrypted header data.

Referring now to step 1106, the present embodiment then decodes the scalably encoded regions to provide decoded regions. As described above in conjunction with the description of encoding system 700 of FIGS. 7, 8, and 9, a video frame 1000 as shown in FIG. 10A can be segmented in multiple corresponding regions 1002, 1004, 1006, 1008, 1010, and 1012 as shown in FIG. 10B.

Figure 13:
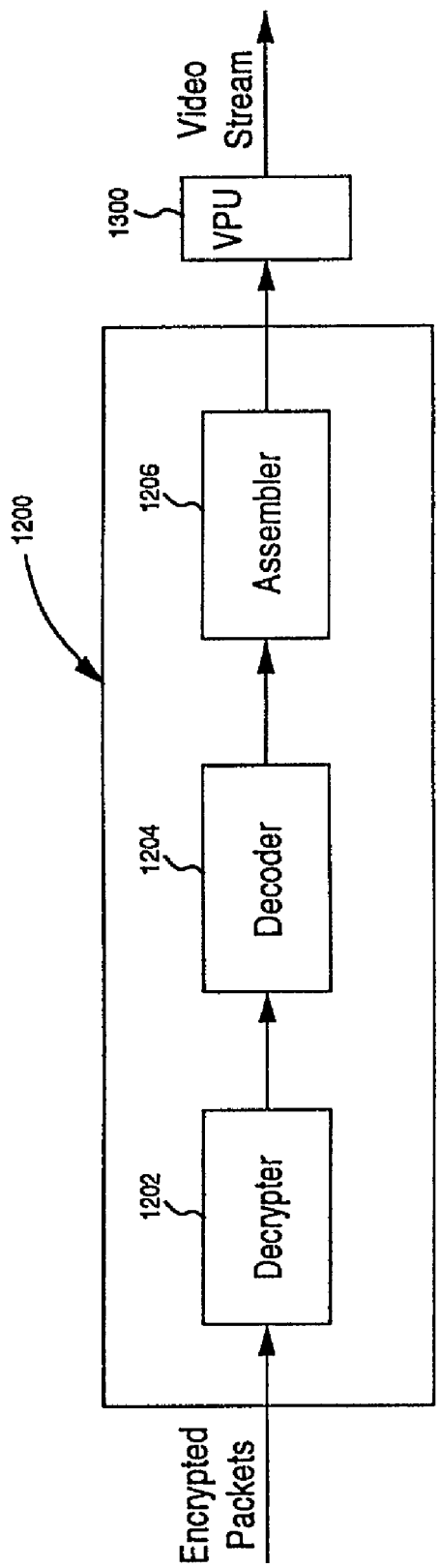
FIG. 13 is a block diagram of a decoding system having a video prediction unit coupled thereto in accordance with one embodiment of the present claimed invention.
Figure 14:
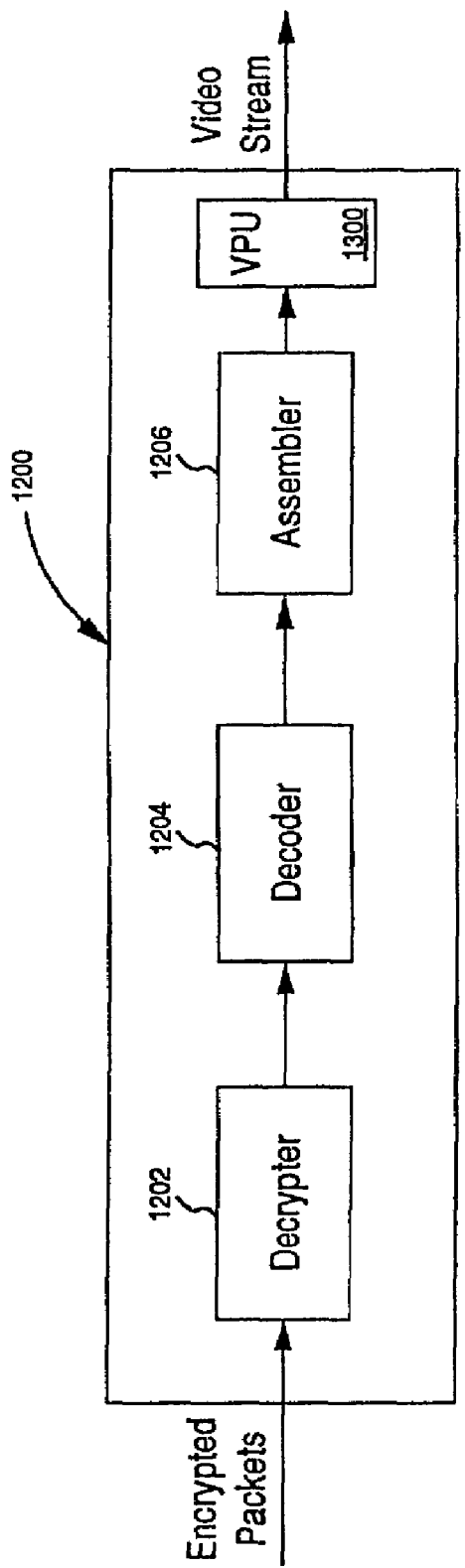
FIG. 14 is a block diagram of a decoding system having a video prediction unit integral therewith in accordance with one embodiment of the present claimed invention.

At step 1108, the present invention then assembles the decoded regions to provide video data. Moreover, assembler 1206 of decoding system 1200 of FIG. 12 assembles the decoded regions to provide video data. In one embodiment of the present invention, decoding system 1200 then provides, as output, video data in the form of an uncompressed video stream. In another embodiment of the present invention, assembler 1206 outputs video data comprised of prediction error video data suitable for use by a video prediction unit (VPU). As shown FIG. 13, in one embodiment of the present invention, decoder system 1200 has a VPU 1300 coupled thereto. VPU 1300 uses the output of assembler 1206 to ultimately provide an uncompressed stream of video frame data. Although VPU 1300 of FIG. 13 is disposed outside of decoding system 1200, the present invention is also well suited to having VPU 1300 integral with decoding system 1200. FIG. 14 illustrates one embodiment of the present invention in which VPU 1300 is integral with decoding system 1200. Hence, the present invention provides a method and system for decoding video data which has been securely and scalably encoded.

Transcoding Method and System

Figure 15A:
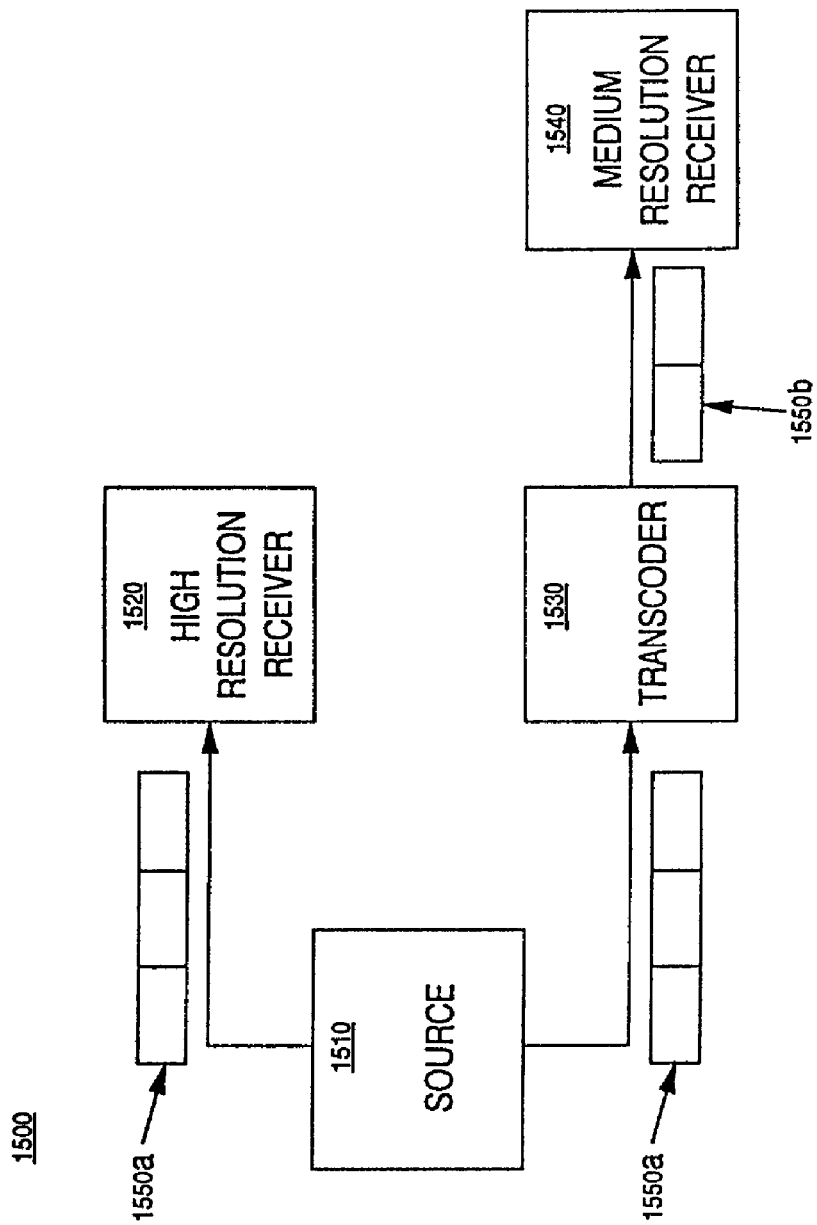
FIG. 15A is a block diagram of an exemplary hybrid wired/wireless network upon which embodiments of the present invention may be practiced.

FIG. 15A is a block diagram of an exemplary hybrid wired/wireless network 1500 upon which embodiments of the present invention may be practiced. In hybrid wired/wireless network 1500, media (e.g., video) data are streamed to fixed clients (stationary receiving nodes) via a wired link and to mobile clients (moving receiving nodes) via a wireless link.

In the present embodiment, hybrid wired/wireless network 1500 includes a wired sender (source 1510), a wired high-resolution receiver 1520, and a wireless medium-resolution receiver 1540. In this system, source 1510 generates a full-bandwidth, high-resolution video stream 1550a that is sent to high-resolution receiver 1520. A transcoder 1530, placed either at source 1510, at medium-resolution receiver 1540, or at an intermediate node such as a wired/wireless gateway, transcodes the stream 1550a into a lower-bandwidth, medium-resolution video stream 1550b which is then sent to medium-resolution receiver 1540.

Figure 15B:
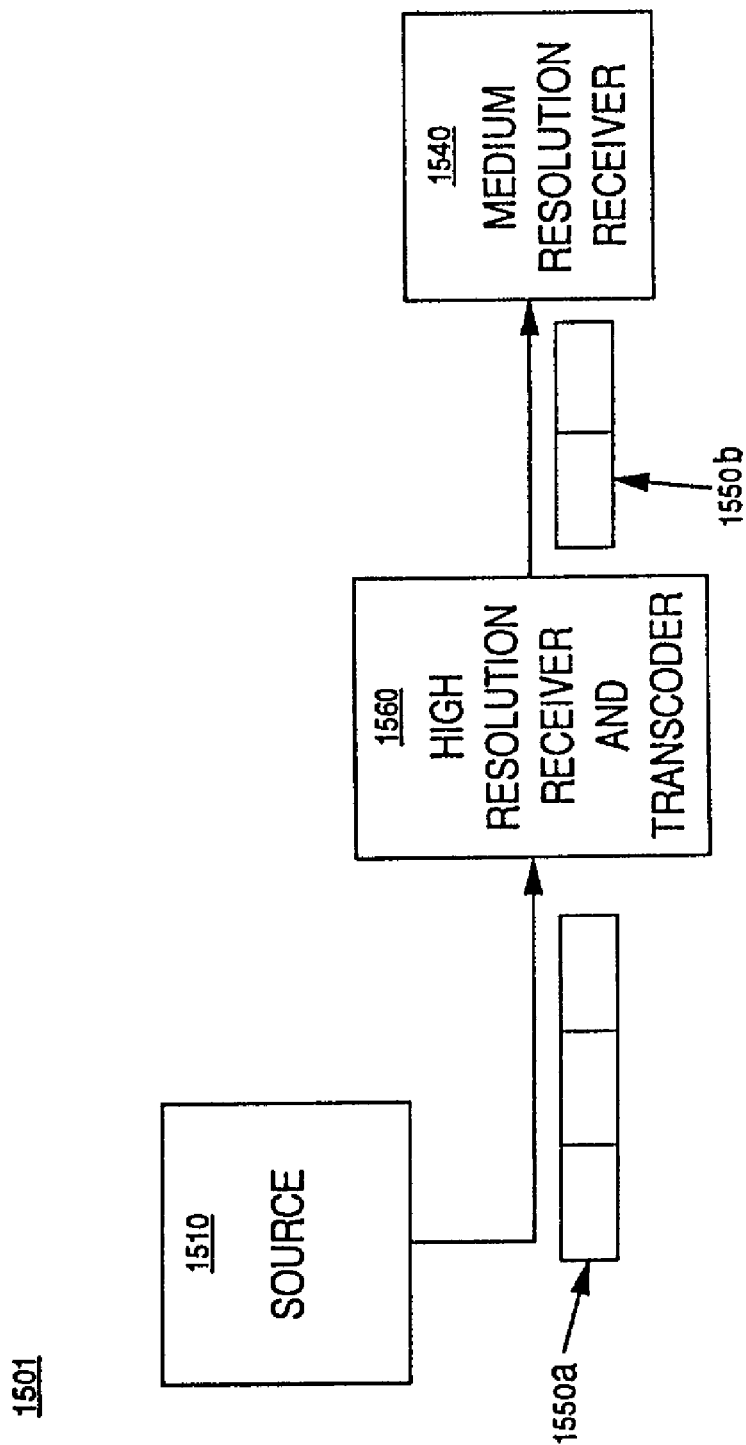
FIG. 15B is a block diagram of an exemplary wireless network upon which embodiments of the present invention may be practiced.

FIG. 15B is a block diagram of an exemplary wireless network 1501 (e.g., a wireless appliance network) upon which embodiments of the present invention may be practiced. In wireless appliance networks, mobile senders and receivers communicate with one another over wireless links. A sender's coverage area is limited by the power of the transmitted signal. Relay devices can be used to extend the wireless coverage area when intended receivers are beyond the immediate coverage area of the sender. In the case of heterogeneous receivers (e.g., receiving nodes having different display, power, computational, and communication characteristics and capabilities), transcoders can be used to adapt a video stream for a particular receiver or communication link. Transcoding can be performed in a relay device or in a receiver which also acts as a relay. Transcoding can also be performed by the sender or by the receiving node.

In the present embodiment, wireless network 1501 includes a wireless sender (source 1510), a high-resolution receiver and transcoder 1560, and a medium-resolution (lower bandwidth) receiver 1540. In wireless network 1501, the high-resolution receiver 1560 receives and transcodes the high-resolution video stream 1550a, and relays the resulting lower-bandwidth stream 1550b to the medium-resolution receiver 1540.

Referring to FIGS. 15A and 15B, both hybrid wired/wireless network 1500 and wireless network 1501 use network transcoders to transcode video streams 1550a into lower bandwidth streams 1550b that match the display capabilities of the target wireless nodes (e.g., medium-resolution receiver 1540). Generally speaking, these networks illustrate how network transcoding can enable efficient use of wireless spectrum and receiver resources by transcoding media (e.g., video) streams into formats better suited for transmission over particular channels and for the capabilities of the receiving nodes.

Figure 16:
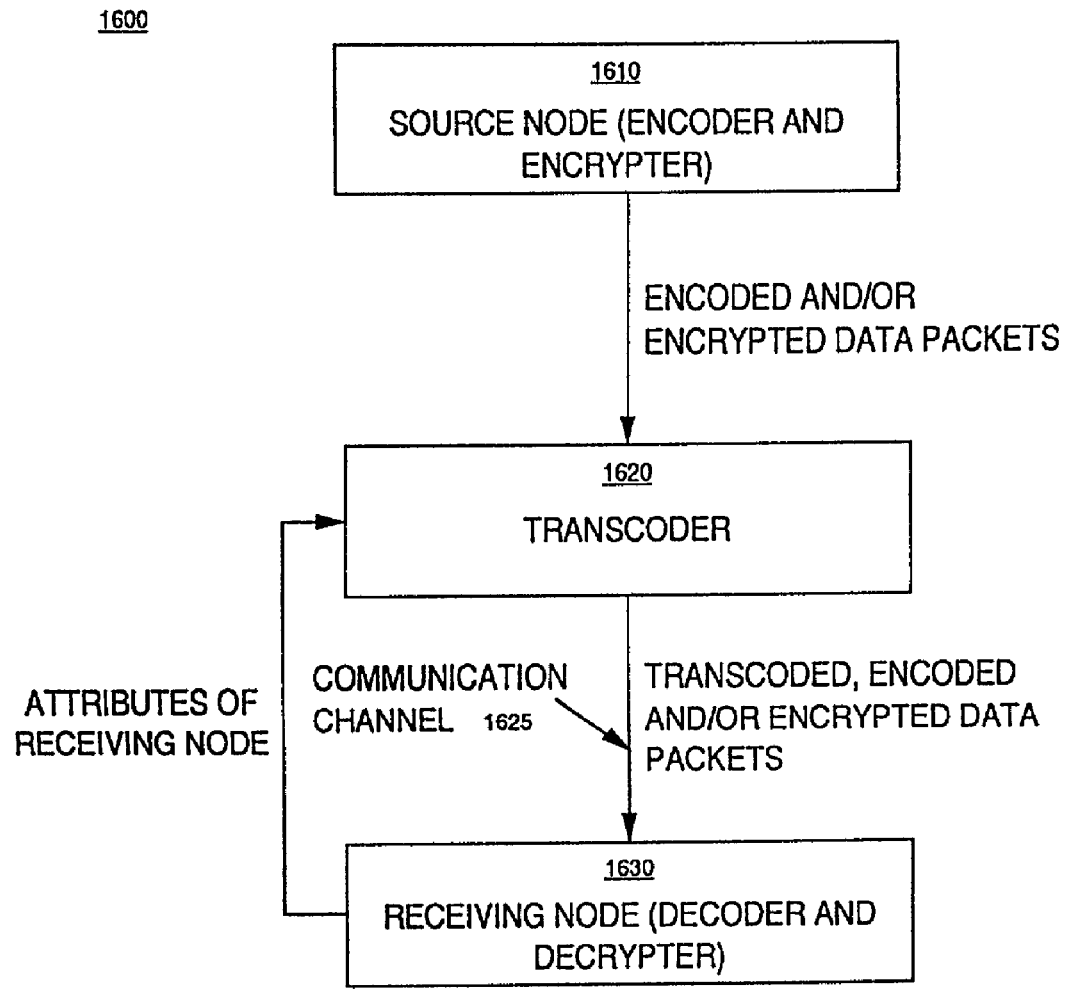
FIG. 16 is a block diagram of a source node, an intermediate (transcoder) node, and a receiving node in accordance with one embodiment of the present invention.

FIG. 16 is a block diagram of a system 1600 including a source node 1610, an intermediate (transcoder) node 1620, and a receiving node 1630 in accordance with one embodiment of the present invention. In this embodiment, transcoder 1620 is a separate node transposed between source node 1610 and receiving node 1630. However, the functions performed by transcoder 1620 may instead be performed by source node 1610 or by receiving node 1630.

In the present embodiment, source node 1610 encodes and/or encrypts a stream of data packets and sends these data packets to transcoder 1620; as described above. In one embodiment, each of the data packets in the stream has a header portion and a payload portion (see FIG. 20, below); in another embodiment, the data packet has only a payload portion (see FIG. 21, below). The payload portion carries the data, while the header portion carries information that is used by transcoder 1620 to transcode the payload portion. A data packet, including the information carried by the header portion, and the transcoding method used by transcoder 1620 are further described below. In one embodiment, only the payload portion is encrypted and encoded. In another embodiment, the payload portion is encrypted and encoded, and the header portion is also encrypted.

In the present embodiment, transcoder 1620 performs a transcoding function on the data packets received from source node 1610. The transcoding function performed by transcoder 1620 is described in conjunction with FIG. 19, below. The purpose of the transcoding function is to configure the stream of data packets according to the attributes downstream of transcoder 1620, such as the attributes of the receiving node 1630 or the attributes of communication channel 1625 linking transcoder 1620 and receiving node 1630. The transcoding function can include, for example, truncation of the data packets or elimination of certain data packets from the stream. In the case in which the stream is already configured for the receiving node 1630 or for communication channel 1625, the transcoding function consists of a pass-through of the data packets in the stream without modification.

Of particular significance, in accordance with the present invention, transcoder 1620 performs a transcoding function without decrypting and/or decoding the data packets (specifically, the media data in the data packets). In the embodiment in which the data packets have a header portion and a payload portion, and where the header portion is encrypted, transcoder 1620 only decrypts the header portion. In either case, in comparison to a conventional transcoder, transcoder 1620 of the present invention requires less computational resources because there is no need to decrypt the media data. In addition, the present invention provides end-to-end security while enabling very low complexity transcoding to be performed at intermediate, possibly untrusted, nodes without compromising the security of the media data.

Continuing with reference to FIG. 16, transcoder 1620 has knowledge of the attributes of receiving node 1630 and/or communication channel 1625. These attributes include, but are not limited to, the display, power, communication and computational capabilities and characteristics of receiving node 1630 or the available bandwidth on communication channel 1625. For example, in one embodiment, transcoder 1620 receives the attribute information from receiving node 1630, or transcoder 1620 reads this information from receiving node 1630. In another embodiment, transcoder 1620 may be implemented as a router in a network; the router can determine if there is congestion on the next "hop" and transcode the stream of data packets accordingly.

In the present embodiment, after transcoding, transcoder 1620 sends the resultant stream of data packets, comprising the encoded and encrypted data packets, to receiving node 1630.

Figure 17:
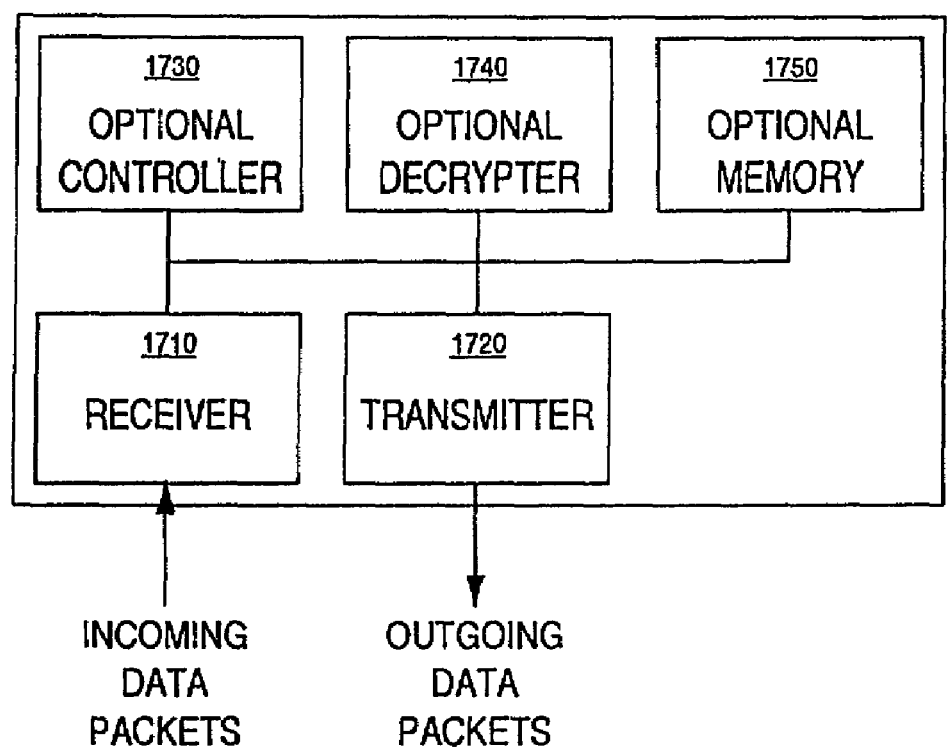
FIG. 17 is a block diagram of one embodiment of a transcoder device upon which embodiments of the present invention may be practiced in accordance with one embodiment of the present claimed invention.

FIG. 17 is a block diagram of one embodiment of a transcoder device 1620 upon which embodiments of the present invention may be practiced. In this embodiment, transcoder 1620 includes a receiver 1710 and a transmitter 1720 for receiving a stream of data packets from source node 1610 (FIG. 16) and for sending a stream of data packets to receiving node 1630 (FIG. 16), respectively. Receiver 1710 and transmitter 1720 are capable of either wired or wireless communication. Separate receivers and transmitters, one for wired communication and one for wireless communication, may also be used. It is appreciated that receiver 1710 and transmitter 1720 may be integrated as a single device (e.g., a transceiver).

Continuing with reference to FIG. 17, transcoder device 1620 may include an optional controller 1730 (e.g., a processor or microprocessor), an optional decrypter 1740, and an optional memory 1750, or a combination thereof. In one embodiment, decrypter 1740 is used to decrypt header information. In another embodiment, memory 1750 is used to accumulate data packets received from source node 1610 before they are forwarded to receiving node 1630 (FIG. 16).

FIGS. 18A, 18B, 18C, 18D and 18E are data flow diagrams illustrating various embodiments of a method for transcoding data packets in accordance with the present invention. In the embodiments of FIGS. 18A–18D, the data packets each have a header portion and a payload portion; in the embodiment of FIG. 18E, the data packets do not have a header portion. In each of the embodiments of FIGS. 18A–18E, the data packets (specifically, the media data) are encrypted and may be encoded. The embodiments of FIGS. 18A–18E are separately described in order to more clearly describe certain aspects of the present invention; however, it is appreciated that the present invention may be implemented by combining elements of these embodiments.

In accordance with the present invention, the method for transcoding data packets is performed on the encrypted data packets; that is, the media data are not decrypted. Transcoding functions can include truncation of the data packets (specifically, the payload portions of the data packets), eliminating certain data packets from the stream, or passing the data packets through without modification.

Figure 18A:
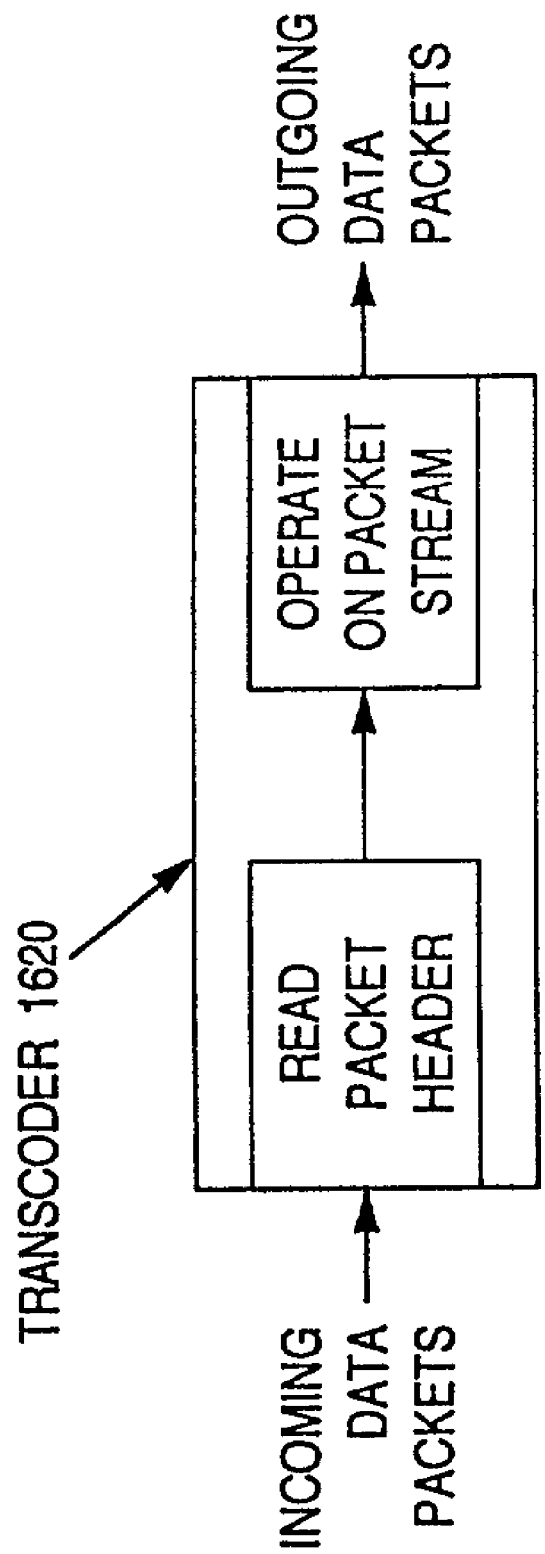
FIGS. 18A, 18B, 18C, 18D and 18E are data flow diagrams illustrating various embodiments of a method for transcoding data packets in accordance with one embodiment of the present claimed invention.

With reference first to FIG. 18A, incoming encrypted and/or encoded data packets are received by transcoder 1620. In this embodiment, the header portion of each data packet is not encrypted. Transcoder 1620 reads the header portion, which contains information that can be used to make transcoding decisions. In one embodiment, the information in the header portion includes specification of the truncation points. In another embodiment, the truncation points are derived from the information provided in the header.

For example, the header portion may contain information specifying recommended points (e.g., a number of a bit) for truncating the payload portion of the data packets. It is appreciated that each data packet may have a different truncation point. The recommended truncation point can be selected using a variety of techniques. In one embodiment, the truncation point for each data packet is specified according to an analysis such as a rate-distortion (RD) analysis, so that the stream of data packets can be compressed to a rate that is RD optimal or near-RD optimal. In another embodiment, the header portion contains information that describes the RD curves generated by the RD analysis, and the truncation points are derived from further analysis of the RD curves.

In the present embodiment, RD optimal coding is achieved by generating an RD plot for each region of a video image, and then operating on all regions at the same slope that generates the desired total bitrate. Near-optimal transcoding can be achieved at the data packet level by placing the optimal RD cutoff points for a number of quality levels in the header portions of the data packets. Then, transcoder 1620 (FIG. 16) can truncate each packet at the appropriate cutoff point; thus, the resulting packets will contain the appropriate number of bits for each region of the image for the desired quality level. Transcoder 1620 reads each packet header, then truncates the packet at the appropriate point. For example, if three regions in an image are coded into separate packets, for each region three RD optimal truncation points are identified and their locations placed in the respective packet header. Transcoder 1620 can choose to operate at any of the three RD points (or points in between), and then can truncate each packet at the appropriate cutoff point.

The header portion may also contain information identifying each data packet by number, for example. Accordingly, transcoder 1620 can eliminate certain data packets from the stream; for example, if every other packet is to be eliminated (e.g., the odd-numbered packets), transcoder 1620 can use the header information to identify the odd-numbered data packets and eliminate those from the stream of data packets.

Figure 18B:
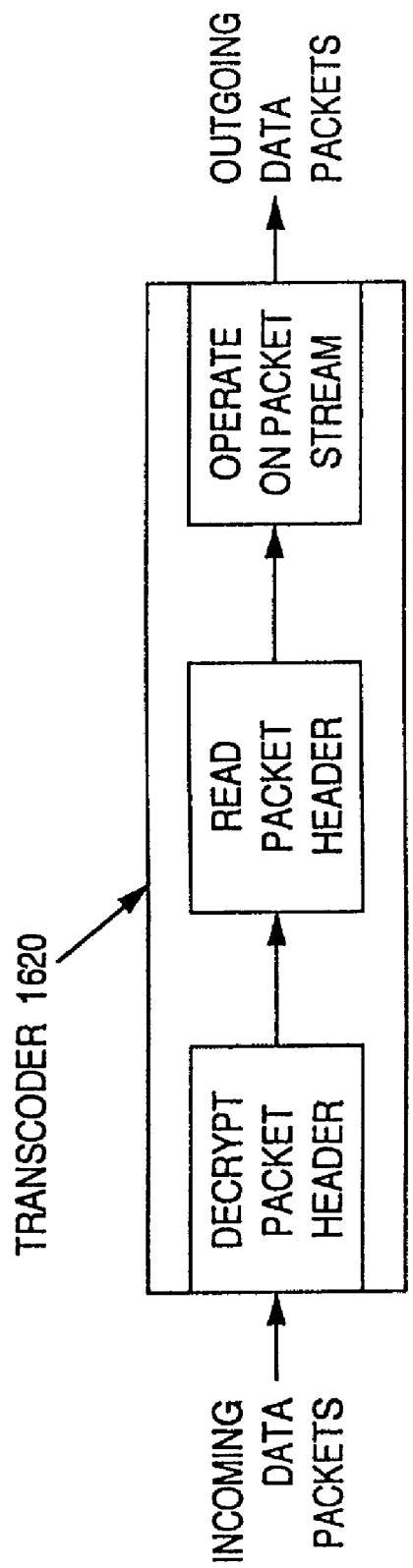

The embodiment of FIG. 18B is similar to that of FIG. 18A, except that the header portion of each data packet is encrypted. In this case, transcoder 1620 first decrypts the header portion before reading the header information and operating on the stream of data packets as described above.

Figure 18C:
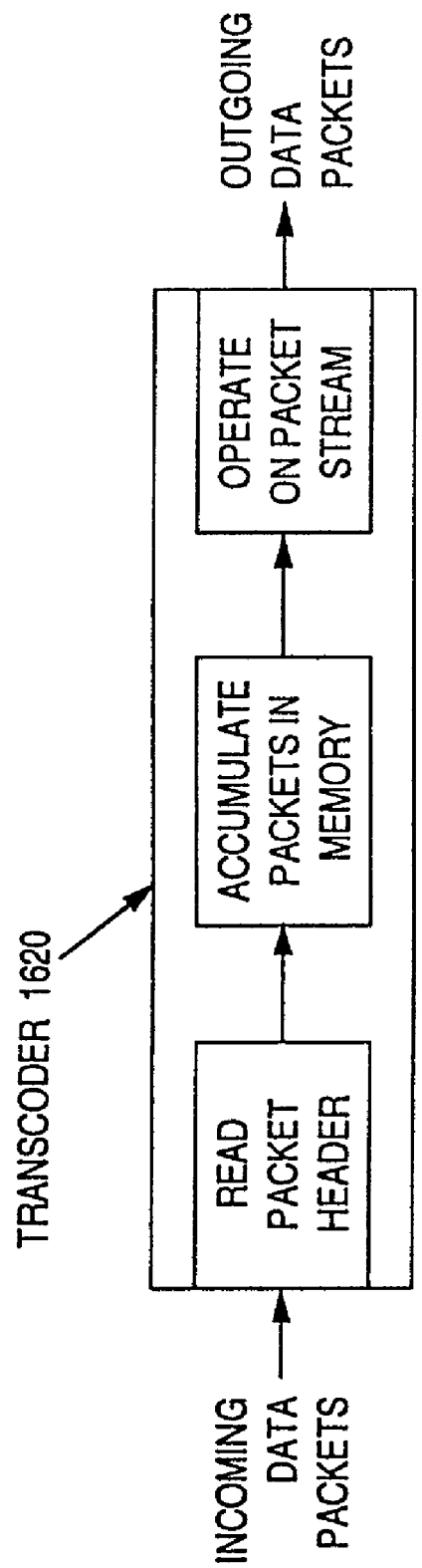

In the embodiment of FIG. 18C, data packets are accumulated in memory. That is, instead of a first-in/first-out type of approach, a subset of the data packets in the stream is accumulated and stored in memory (e.g., memory 1750 of FIG. 17) before they are forwarded to the receiving node. In this embodiment, the header information for all of the accumulated data packets in the subset is used to make transcoding decisions. The transcoding decisions are made based on the attributes of the receiving node 1630 or the attributes of the communication channel 1625 (FIG. 16), as described previously herein. It may be possible, and perhaps desirable, to configure the stream of data packets according to the attributes of the receiving node or communication channel without operating on every data packet in the stream. For example, instead of truncating all of the data packets in the subset, a decision may be made to truncate only a portion of the packets in the subset, or to truncate the packets at a point other than the recommended truncation point.

Figure 18D:
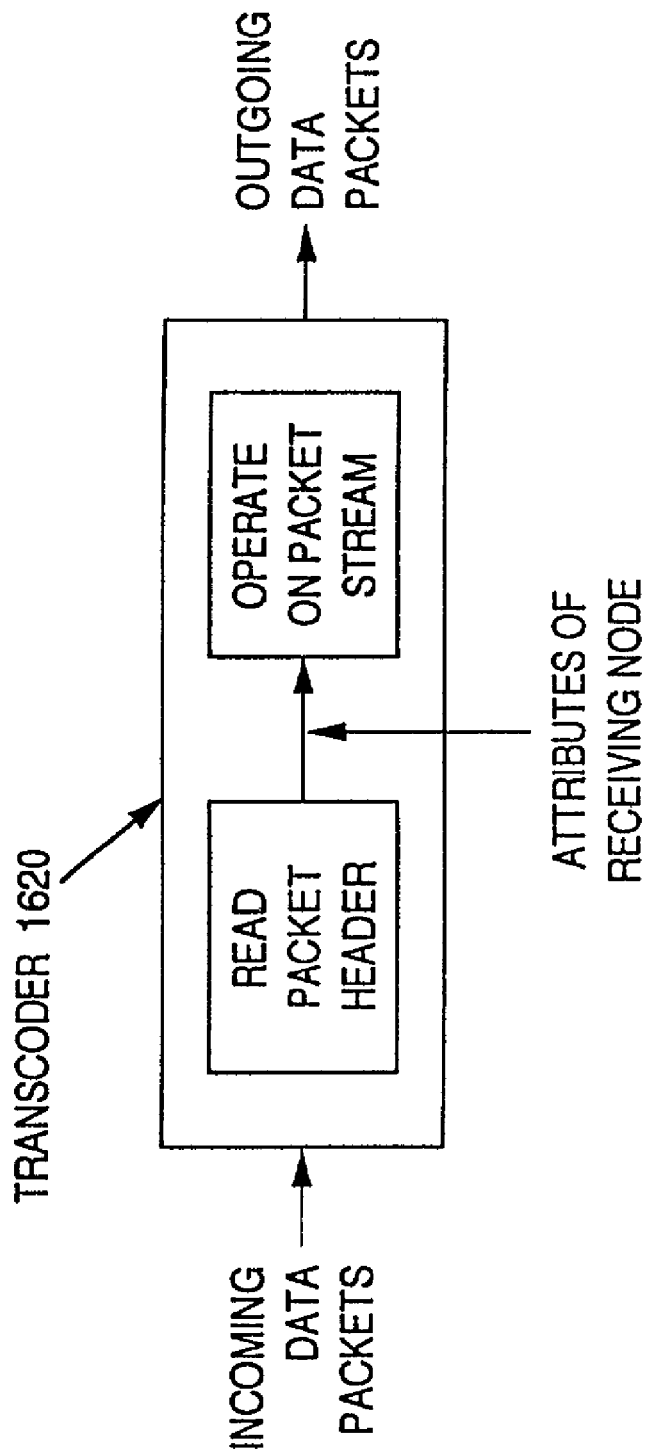

In the embodiment of FIG. 18D, transcoder 1620 receives information from the downstream receiving node (e.g., receiving node 1630 of FIG. 16). In one embodiment, the information describes attributes of receiving node 1630, such as its display, power, computational and communication capabilities and characteristics. Based on the information received from receiving node 1630, transcoder 1620 can make transcoding decisions based on the information in the header portions of the data packets. For example, transcoder 1620 can pick a truncation point depending on whether receiving node 1630 is a medium- or low-resolution device, and transcoder 1620 can choose not to modify the stream of data packets if receiving node 1630 is a high-resolution device. Similarly, transcoder 1620 can receive information describing the attributes of communication channel 1625 (FIG. 16).

Figure 18E:
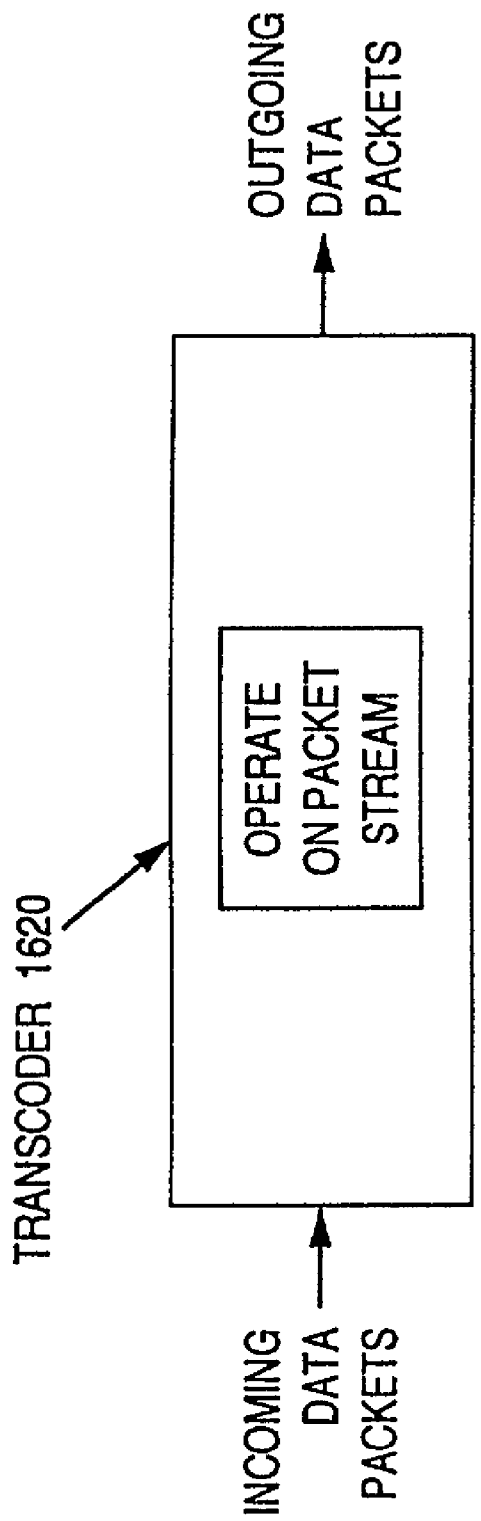

In the embodiment of FIG. 18E, the incoming data packets do not have a header portion. Accordingly, transcoder 1620 makes transcoding decisions based on a pre-defined set of rules. That is, instead of truncating each data packet at a different point specified by the information in the header portion, transcoder 1620 may truncate all data packets in the stream at the same point, depending on the attributes of the receiving node or communication channel.

FIG. 19 is a flowchart of the steps in a process 1900 for transcoding data packets in accordance with one embodiment of the present invention. In one embodiment, process 1900 is implemented by transcoder device 1620 (FIG. 17) as computer-readable program instructions stored in memory 1750 and executed by controller 1730. Although specific steps are disclosed in of FIG. 19, such steps are exemplary. That is, the present invention is well suited to performing various other steps or variations of the steps recited in FIG. 19.

In step 1910 of FIG. 19, a stream of data packets is received from a source node (e.g., source 1610 of FIG. 16). In the present embodiment, the data packets include encrypted data. In one embodiment, the data are also encoded. In another embodiment, the data packets include a header portion and a payload portion. In one embodiment, the header portion is also encrypted.

In step 1915 of FIG. 19, in one embodiment, information describing the attributes of a downstream receiving node (e.g., receiving node 1630 of FIG. 16) or communication channel (e.g., communication channel 1625 of FIG. 16) is received. In another embodiment, the attributes of receiving node 1630 or communication channel 1625 are already known.

In step 1920 of FIG. 19, a transcoding function is performed on the stream of data packets to configure the stream according to the attributes of receiving node 1630. Significantly, the transcoding function is performed without decrypting the data in the data packets. In one embodiment, the transcoding function is performed on information provided by the header portion of each data packet. In one such embodiment, the header information provides recommended truncation points for the payload portion of the respective data packet. In another embodiment, the truncation points are derived from the information provided in the header portion.

In step 1922, in one embodiment, the transcoding function eliminates certain data packets from the stream. In step 1924, in one embodiment, the transcoding function truncates the data in the data packets. It is appreciated that each data packet may have a different truncation point. In step 1926, in one embodiment, the transcoding function passes the data packets through without modification.

In step 1930, the transcoded data packets (still encrypted and/or encoded) are sent to receiving node 1630.

In summary, the above-listed embodiment of the present invention provides a secure method and system for transcoding data for a variety of downstream attributes, such as the attributes of receiving nodes having different capabilities and characteristics or the attributes of the communication between the transcoder and a receiving node. Because the encrypted data do not need to be decrypted and then encrypted again, the computational resources needed for transcoding the stream of data packets is significantly reduced, and the security of the data is not compromised.

Secure Scalable Data Packet

Figure 20:
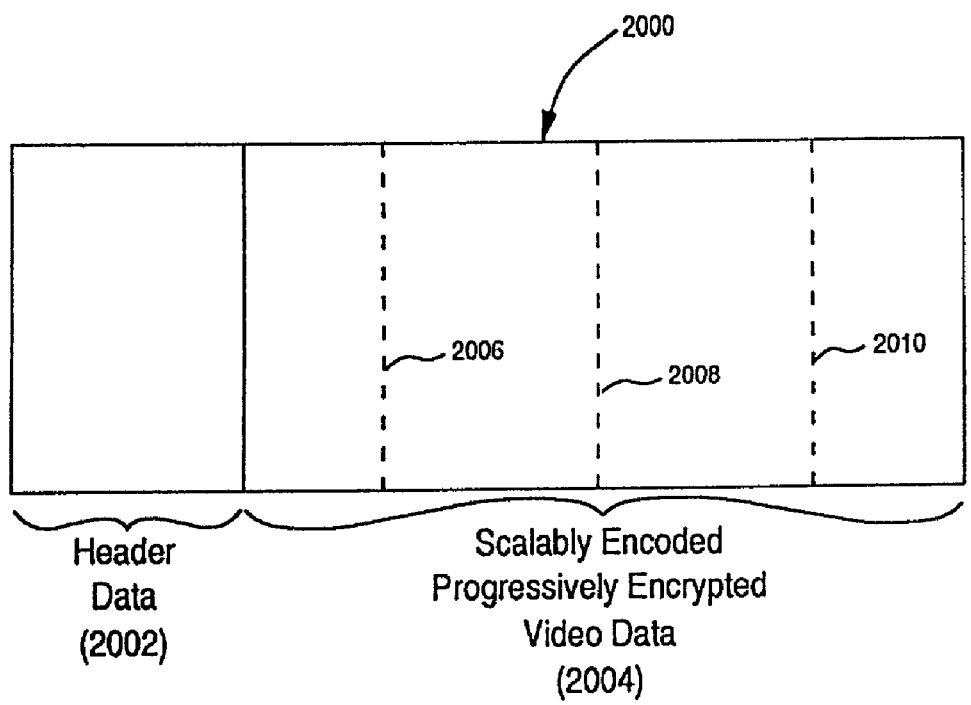
FIG. 20 is a schematic representation of a data packet including header data and scalably encoded, progressively encrypted data in accordance with one embodiment of the present claimed invention.

With reference now to FIG. 20, a schematic representation of a data packet 2000 formed in accordance with one embodiment of the present invention is shown. Furthermore, as mentioned above, for purposes of clarity and brevity, the following discussion and examples will specifically deal with video data. The present invention, however, is not limited solely to use with video data. Instead, the present invention is well suited to use with audio-based data, image-based data, web page-based data, and the like. It will be understood that in the present embodiments, data packet 2000 is generated by encoding system 700 of FIGS. 7, 8, and 9, operated on by transcoder 1620 of FIGS. 16, 18A, 18B, 18C, 18D, and 18E, and then ultimately forwarded to decoding system 1200 of FIGS. 12, 13, and 14. During the aforementioned process, data packet 2000 is stored on computer readable media residing in, and causes a functional change or directs the operation of, the devices (e.g., general purpose networked computer systems, embedded computer systems, routers, switches, server devices, client devices, various intermediate devices/nodes, stand alone computer systems, and the like) in which, for example, transcoder 1620 and/or decoder 1200 are implemented.

In the embodiment of FIG. 20, data packet 2000 includes header data portion 2002 and scalably encoded, progressively encrypted video data portion 2004. As mentioned above, header data portion 2002 includes information that is used by transcoder 1620 to transcode the scalably encoded, progressively encrypted video data portion 2004. For example, header data portion 2002 may contain information specifying recommended points (e.g., a number of a bit) for truncating the payload portion (e.g., the scalably encoded, progressively encrypted video data portion 2004) of data packet 2000. Header data portion 2002 may also contain information identifying each data packet by number, for example. Accordingly, transcoder 1620 can eliminate certain data packets from the stream; for example, if every other packet is to be eliminated (e.g., the odd-numbered packets), transcoder 1620 can use the information in header data portion 2002 to identify the odd-numbered data packets and eliminate those from the stream of data packets.

With reference still to FIG. 20, data packet 2000 also includes potential truncation points 2006, 2008, and 2010 within scalably encoded, progressively encrypted video data portion 2004. Although such truncation points are shown in FIG. 20, the configuration of truncation points 2006, 2008, and 2010 is exemplary only. That is, the present invention is well suited to having a lesser or greater number of truncation points, and to having the truncation points located other than where shown in FIG. 20. Again, as mentioned above, truncation points 2006, 2008, and 2010 are used by transcoder 1620 during its operation on packet 2000. Additionally, in one embodiment of the present invention, header data portion 2002 is encrypted.

Figure 21:
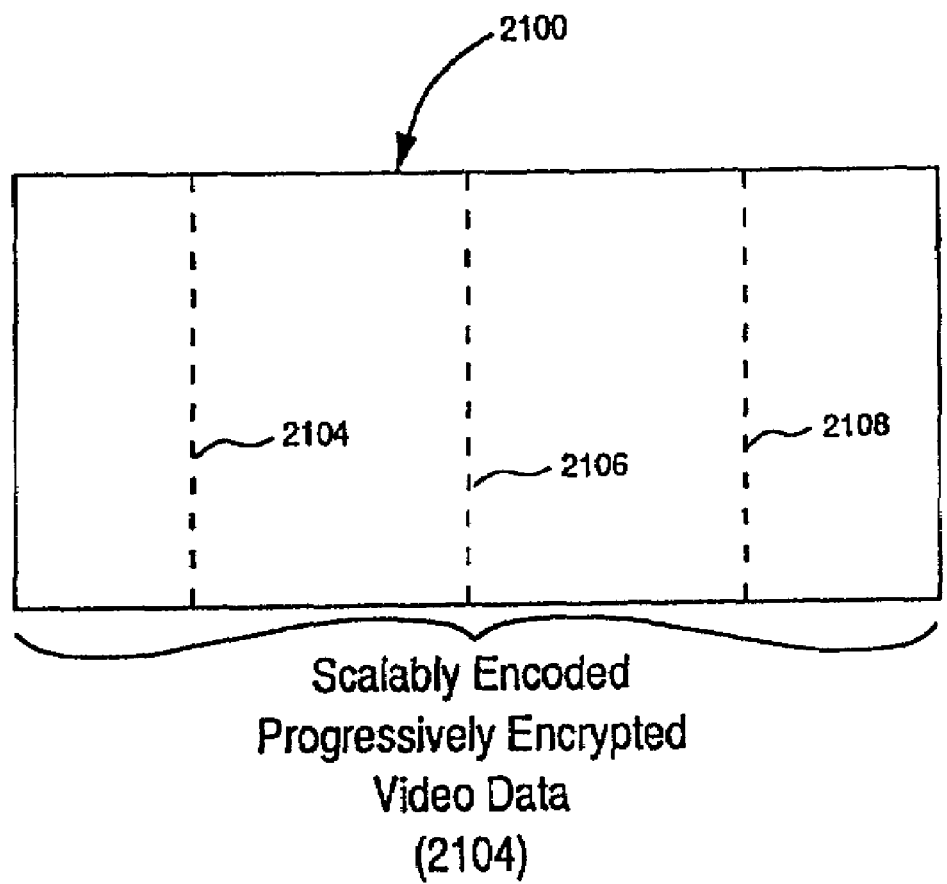
FIG. 21 is a schematic representation of a data packet including scalably encoded, progressively encrypted data in accordance with one embodiment of the present claimed invention.

In the embodiment of FIG. 21, data packet 2100 does not include a header data portion, and instead includes only scalably encoded, progressively encrypted video data portion 2104. With reference still to FIG. 21, data packet 2100 also includes potential truncation points 2104, 2106, and 2108 within scalably encoded, progressively encrypted video data portion 2104. Although such truncation points are shown in FIG. 21, the configuration of truncation points 2104, 2106, and 2108, is exemplary only. That is, the present invention is well suited to having a lesser or greater number of truncation points, and to having the truncation points located other than shown in FIG. 21. Again, as mentioned above, truncation points 2104, 2106, and 2108 are used by transcoder 1620 during its operation on packet 2100.

Thus, the present invention provides, in one embodiment, a secure and scalable encoding method and system for use in the streaming of data. The present invention further provides, in one embodiment, a method for decoding data which has been securely and scalably encoded.

Encoding and Encrypting Devices for Secure Scalable Data Streaming

Figure 22A:
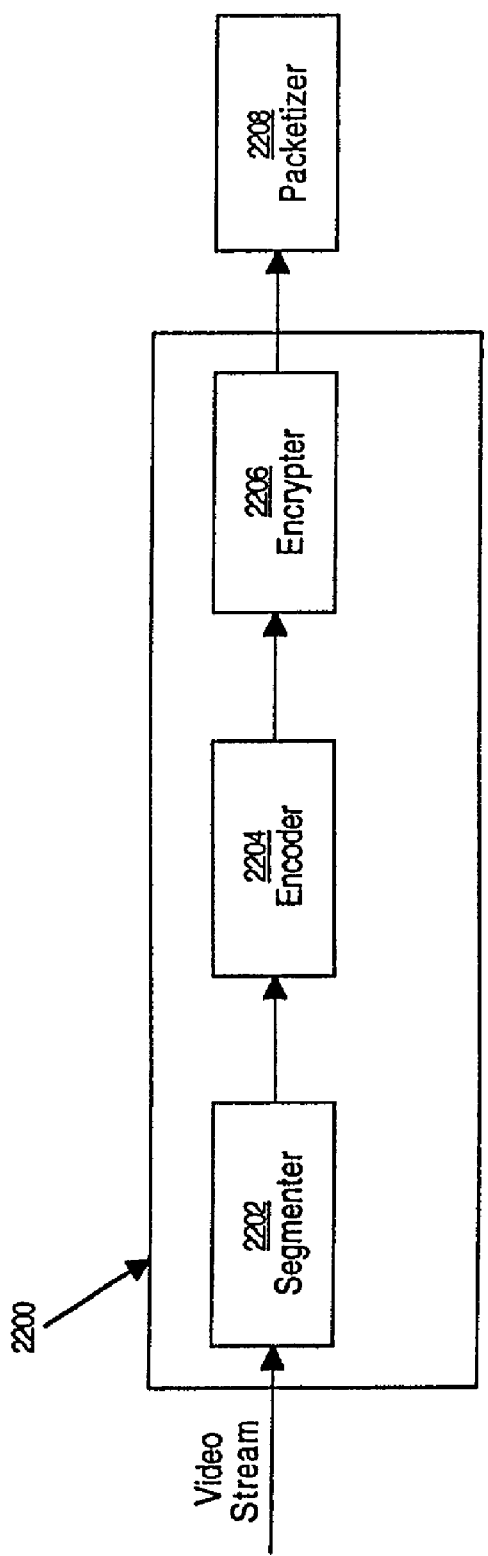
FIGS. 22A and 22B are block diagrams of devices for encoding and encrypting data in accordance with various embodiments of the present claimed invention.

FIG. 22A is a block diagram of a device 2200 for scalably encoding and progressively encrypting data in accordance with one embodiment of the present claimed invention. As an overview, the present invention is directed towards any data which can be scalably encoded and, specifically, any data that combine scalable encoding with progressive encryption. For purposes of the present application, scalable coding is defined as a process which takes original data as input and creates scalably coded data as output, where the scalably coded data have the property that portions of it can be used to reconstruct the original data with various quality levels. Specifically, the scalably coded data are often thought of as an embedded bitstream. The first portion of the bitstream can be used to decode a baseline-quality reconstruction of the original data, without requiring any information from the remainder of the bitstream, and progressively larger portions of the bitstream can be used to decode improved reconstructions of the original data. For purposes of the present application, progressive encryption is defined as a process which takes original data (plain text) as input and creates progressively encrypted data (cipher text) as output, where the progressively encrypted data have the property that the first portion can be decrypted alone, without requiring information from the remainder of the original data; and progressively larger portions can be decrypted with this same property, in which decryption can require data from earlier but not later portions of the bitstream.

In the present embodiment, device 2200 includes a segmenter 2202 coupled to an encoder 2204, which in turn is coupled to an encrypter 2206. The functionality of device 2200 is described in conjunction with FIG. 23, below.

Significantly, in this embodiment, device 2200 of FIG. 22A does not include packetizing device 2208 as an integrated unit; instead, device 2200 is coupled to packetizing device 2208 disposed outside of device 2200. As such, different types of packetization methods can be used with device 2200, depending on the capabilities of downstream channels and devices, for example. In the present embodiment, packetizing device 2208 receives data from device 2200 in real time, that is, as the data are encoded and encrypted.

Figure 22B:
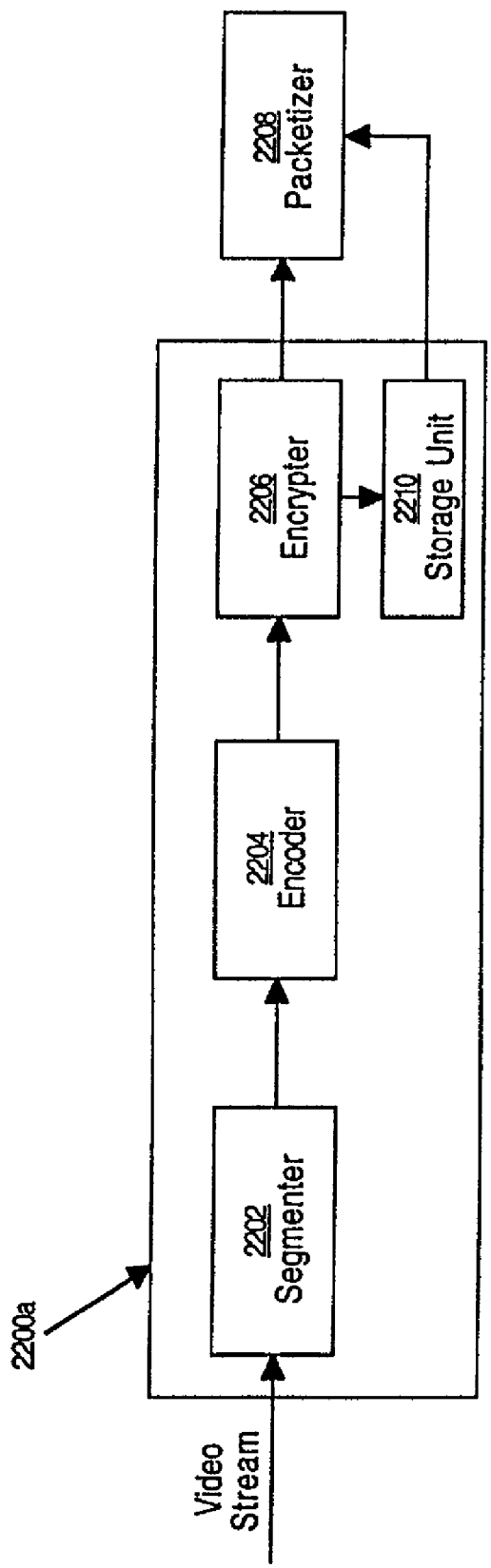

FIG. 22B is a block diagram of a device 2200a for scalably encoding and progressively encrypting data in accordance with another embodiment of the present claimed invention. In this embodiment, device 2200a includes a storage unit 2210 for storing encoded and encrypted data (specifically, scalably encoded and progressively encrypted data) that are output from encoder 2206. Thus, packetizing device 2208 can receive data from device 2200a in real time as the data are encoded and encrypted, or at a later time packetizing device 2208 can receive data from device 2200*a* that are stored in storage unit 2210. In the latter case, packetizing device 2208 can receive all of or a selected portion of the data in storage unit 2210. Thus, for example, the data can be packetized for different types of channels (e.g., channels having different bandwidth), for different types of downstream devices (e.g., receiving nodes having different display, power, computational and communication characteristics and capabilities), or using different packetization methods. Additional information is provided in conjunction with FIG. 24, below.

Figure 23:
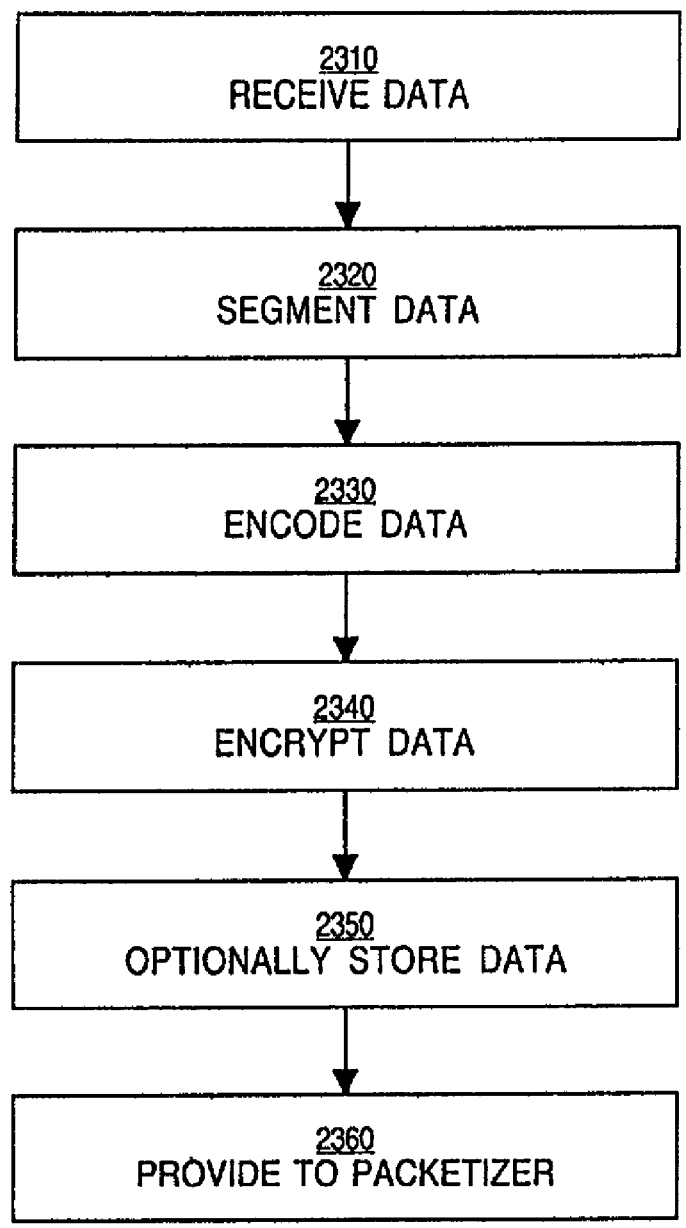
FIG. 23 is a flowchart of the steps in a process for encoding and encrypting data in accordance with one embodiment of the present claimed invention.

FIG. 23 is a flowchart of the steps in a process 2300 for encoding and encrypting data in accordance with one embodiment of the present claimed invention. Although specific steps are illustrated in FIG. 23, such steps are exemplary, and the present invention is well suited to performing various other steps or variations of the steps included in process 2300. Process 2300 is, in one embodiment, carried out by a processor under the control of computer-readable and computer-executable instructions. The computer-readable and computer-executable instructions reside, for example, in data storage features such as computer usable volatile memory 506, computer usable non-volatile memory 508, and/or data storage device 510 of FIG. 5. The computer-readable and computer-executable instructions are used to control or operate in conjunction with, for example, central processing unit 504 of FIG. 5 coupled to or integrated with device 2200 (or 2200*a*) of FIGS. 22A and 22B.

For purposes of clarity and brevity, the following discussion and examples will specifically deal with video data. The present invention, however, is not limited solely to use with video data. Instead, the present invention is well suited to use with audio-based data, image-based data, web page-based data, graphic data and the like ("media data").

In step 2310 of FIG. 23, in the present embodiment, device 2200 (or 2200*a*) receives video data comprised of a stream of uncompressed video frames. In one embodiment, the video data also are comprised of prediction error video data generated by a video prediction unit (VPU). As shown by FIGS. 8 and 9, respectively, the devices 2200 and 2200*a* may be coupled to a VPU or the VPU may be integral with devices 2200 and 2200*a*.

In step 2320 of FIG. 23, in the present embodiment, the video data are segmented into various regions by segmenter 2202 (FIGS. 22A and 22B). Segmentation of video data is described above in conjunction with FIGS. 6 (step 604), 10A, 10B, 10C and 10D. As described, the video data can be segmented into rectangular regions, non-rectangular regions, and overlapping regions, for example.

In step 2330 of FIG. 23, in the present embodiment, at least one of the regions (or all of the regions) are scalably encoded by encoder 2204 (FIGS. 22A and 22B). In one embodiment, each encoded region is encoded into two portions: a header portion comprising header data and a payload portion comprising scalable video data. The header data provide information about the video data, such as the region within the video frame that the video data represent. The header data can also include information that allows a transcoder to transcode the video data without decrypting and decoding the data, as described previously herein. Scalable encoding is described above in conjunction with FIG. 6 (step 606).

In step 2340 of FIG. 23, in the present embodiment, the scalably encoded video data are progressively encrypted by encrypter 2206 (FIGS. 22A and 22B). In the embodiment in which data are encoded into a header portion, the header portion may or may not be encrypted. Progressive encryption is described above in conjunction with FIG. 6 (step 608).

In step 2350 of FIG. 23, in one embodiment, the scalably encoded and progressively encrypted video data are stored in storage unit 2210 (FIG. 22B) prior to packetization.

In step 2360 of FIG. 23, in the present embodiment, the scalably encoded and progressively encrypted video data are provided to a packetizing device 2208 disposed outside of devices 2200 and 2200*a* (FIGS. 22A and 22B). The data can be pushed to packetizing device 2208 or pulled by packetizing device 2208. In the embodiment in which data are not stored, the data are provided to packetizing device 2208 in real time (as the data are scalably encoded and progressively encrypted). In the embodiment in which the data are stored, the data are provided to packetizing device 2208 after storage.

The data provided to packetizing device 2208 may represent the entire set of data that was received by devices 2200 and 2200*a* or a portion thereof. That is, in the real time embodiment, at any one of the stages in device 2200, the data may be reduced because of factors such as the type of channels or the type of downstream devices. Similarly, in the storage embodiment, the data may be reduced at any one of the stages in device 2200*a*. Also in the storage embodiment, only a portion of the data in storage unit 2210 may be provided to packetizing device 2208.

Packetizing Devices for Secure Scalable Data Streaming

Figure 24:
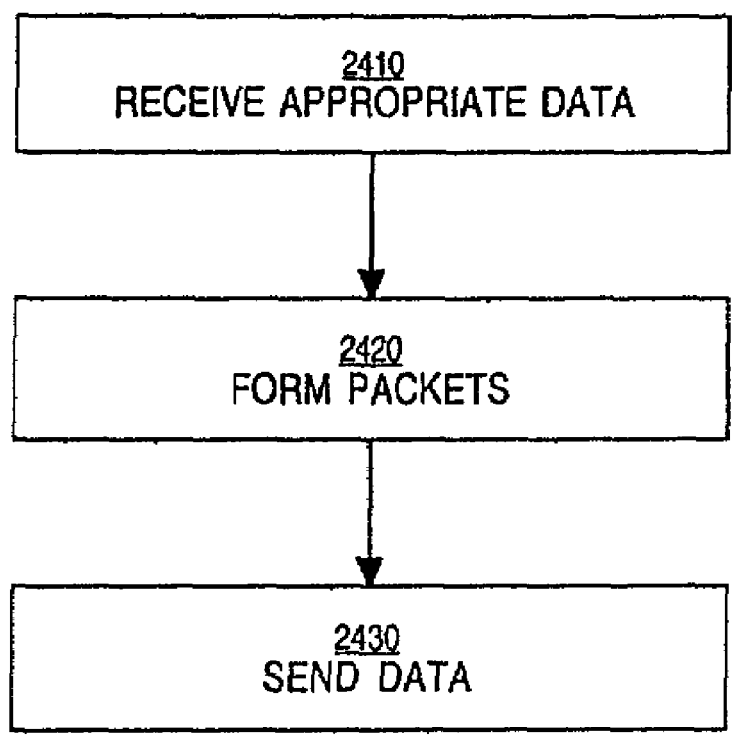
FIG. 24 is a flowchart of the steps in a process for packetizing data in accordance with one embodiment of the present claimed invention.
Figure 25A:
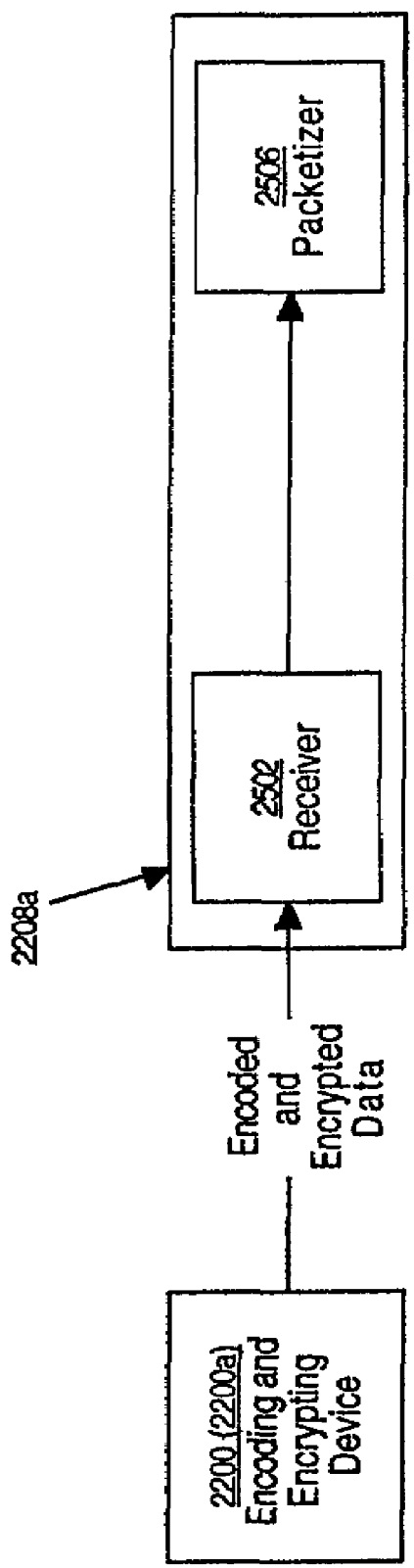
FIGS. 25A, 25B, 25C and 25D are block diagrams of devices for packetizing data in accordance with various embodiments of the present claimed invention.
Figure 25B:
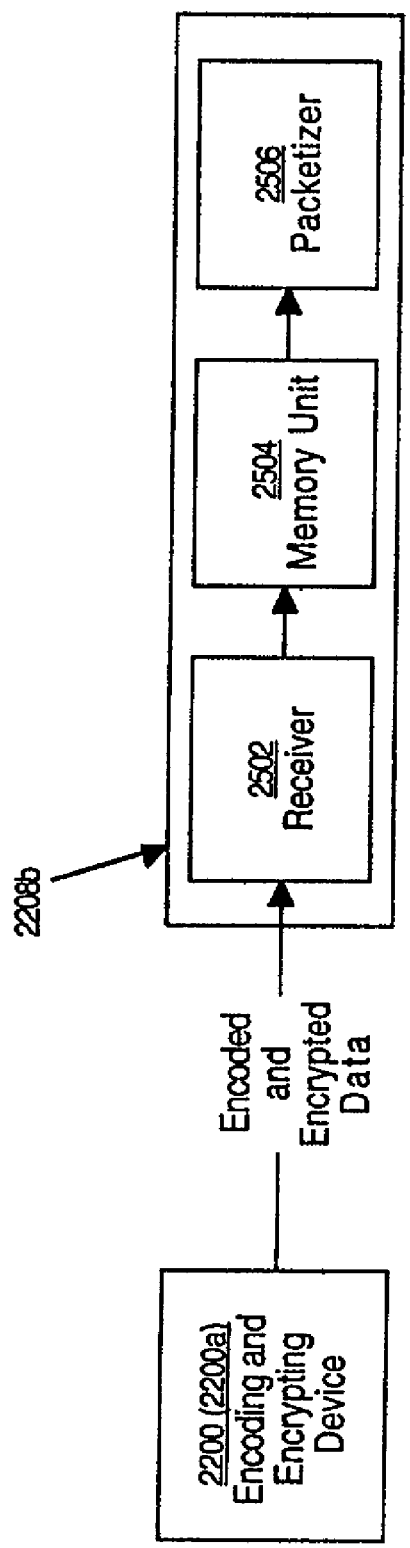
Figure 25C:
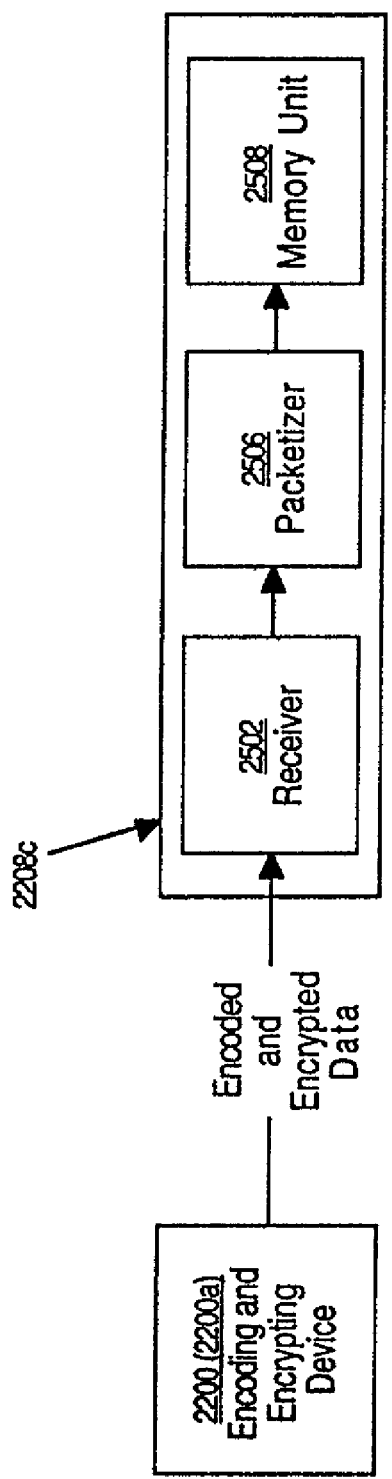
Figure 25D:
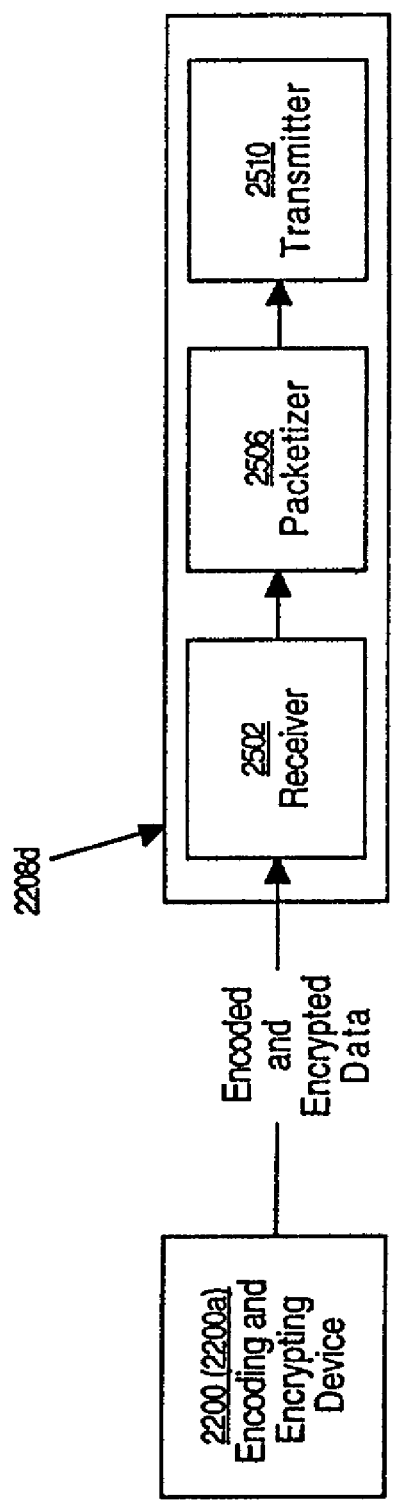

With reference to FIGS. 24, 25A, 25B, 25C and 25D, a process 2400 for packetizing data in accordance with various embodiments of the present claimed invention is described. Although specific steps are illustrated in FIG. 24, such steps are exemplary, and the present invention is well suited to performing various other steps or variations of the steps included in process 2400. Process 2400 is, in one embodiment, carried out by a processor under the control of computer-readable and computer-executable instructions. Process 2400 is performed by a packetizer device disposed external to devices 2200 and 2200*a* (FIGS. 22A and 22B, respectively).

FIGS. 25A–25D show various embodiments of a packetizing device upon which process 2400 of FIG. 24 may be implemented. Each of these embodiments includes a receiver 2502 for receiving a stream of scalably encoded and progressively encrypted data from encoding and encrypting device 2200 or 2200*a* of FIGS. 22A and 22B, respectively. Each of these embodiments also includes a packetizer 2506 for packetizing the scalably encoded and progressively encrypted data (or a portion thereof) into data packets. Packetizing device 2208*b* of FIG. 25B includes a memory unit 2504 for storing scalably encoded and progressively encrypted data prior to packetization. Packetizing device 2208*c* of FIG. 25C includes a memory unit 2508 for storing secure and scalable data packets subsequent to packetization. Packetizing device 2208*d* of FIG. 25D includes a transmitter 2510 for transmitting secure and scalable data packets to a downstream device (e.g., a transcoder such as transcoder 1620 of FIG. 17). Although the embodiments of FIGS. 25A–25D are separately described in order to more clearly illustrate certain aspects of the present invention, it is appreciated that combinations of these embodiments may also be used.

In step 2410 of FIG. 24, with reference also to FIGS. 25A–25D, the data are streamed from encoding and encrypting device 2200 or 2200a to packetizing device 2208a–d using either a push or a pull approach. The data may be received by packetizing device 2208a–d either in real time as they are encoded and encrypted by device 2200 or 2200a, or after storage on those devices. Only a portion of the data may be extracted by or sent to packetizing device 2208a–d. For example, packetizing device 2208a–d may extract only the amount of data appropriate to the attributes of a downstream channel or device.

In one embodiment, the data received from encoding and encrypting device 2200 or 2200a are stored in memory unit 2504 prior to packetization. In this embodiment, packetizer 2206 may packetize only a subset of the data stored in memory unit 2504, depending on the attributes of downstream channels or devices.

In step 2420 of FIG. 24, again with reference also to FIGS. 25A–25D, the data received from devices 2200 and 2200a are formed into data packets by packetizer 2206. In the embodiment in which the data include a header portion as well as a payload portion, the header portion (scalably encoded and either encrypted or unencrypted) is combined and packetized with the payload portion (scalably encoded and progressively encrypted). Packetizer 2208a–d may only packetize a subset of the data, depending on the attributes of downstream channels or devices, for example.

In one embodiment, the data packets received from packetizer 2206 are stored in memory unit 2508. In this case, a subset of the data packets may be retrieved from memory unit 2508, depending on the attributes of downstream receiving devices or channels, for example.

In step 2430 of FIG. 24, with reference also to FIGS. 25A–25D, the secure and scaled data packets can be transmitted (streamed) to downstream receiving devices as described previously herein. In one embodiment, the data packets are transmitted to downstream devices using transmitter 2510. As described above, only a subset of the data packets may be sent depending on downstream attributes and capabilities.

Storage Devices for Secure Scalable Data Streaming

FIGS. 26A, 26B, 26C, 26D, 26E and 26F are block diagrams showing a network of devices for processing and storing data in accordance with various embodiments of the present claimed invention. In one embodiment, the devices are communicatively coupled in a wireless network. In another embodiment, the devices are communicatively coupled in a wired network. In yet another embodiment, the devices are communicatively coupled in a network that combines elements of wireless and wired networks. Although the embodiments of FIGS. 26A–26F are separately described in order to more clearly illustrate certain aspects of the present invention, it is appreciated that combinations of these embodiments may also be used. It is also appreciated that the functions shown in the figures as being performed by more than one device can be combined into a single device.

Figure 26A:
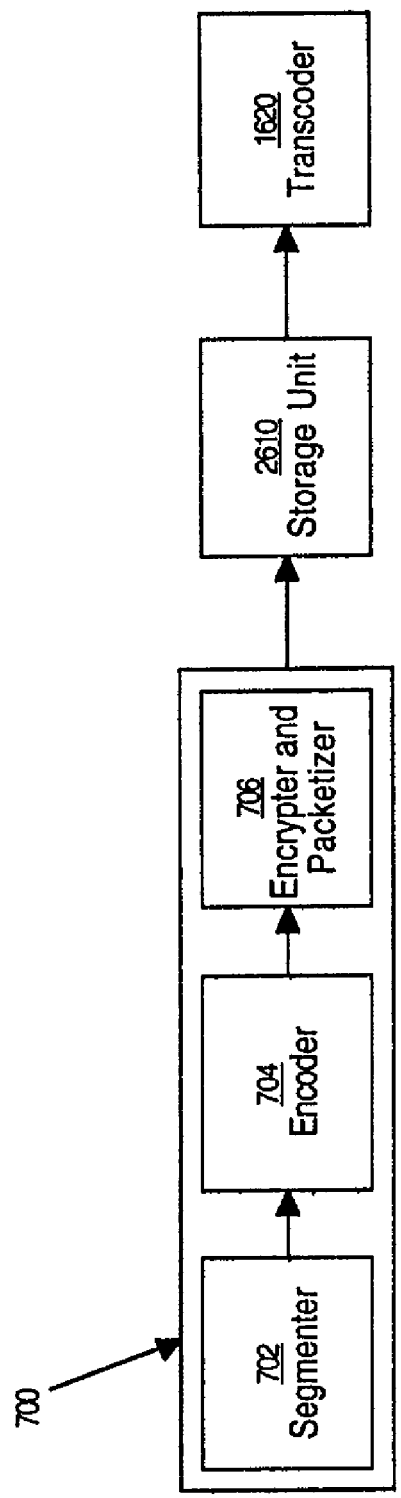
FIGS. 26A, 26B, 26C, 26D, 26E and 26F are block diagrams showing devices for processing and storing data in accordance with various embodiments of the present claimed invention.

FIG. 26A shows an encoder system 700 comprising a segmenter 702, encoder 704, and encrypter and packetizer 706. Encoder system 700 scalably encodes and progressively encrypts incoming data, and packetizes the scalably encoded progressively encrypted data into secure and scalable data packets. Encoder system 700 has been described above in conjunction with FIG. 7.

In the embodiment of FIG. 26A, secure and scalable data packets output by encoder system 700 are stored in a separate device, storage unit 2610. Data packets that are output by encoder system 700 can be stored without regard to the capabilities and attributes of downstream channels or devices. In the present embodiment, all of the data or a portion of the data stored in storage unit 2610 can be subsequently extracted by transcoder 1620. Transcoder 1620 transcodes the data according to the attributes of a downstream receiving node, as described herein (refer to FIG. 16 above). Thus, for example, transcoder 1620 can extract only the amount of data needed for the receiving node.

Figure 26B:
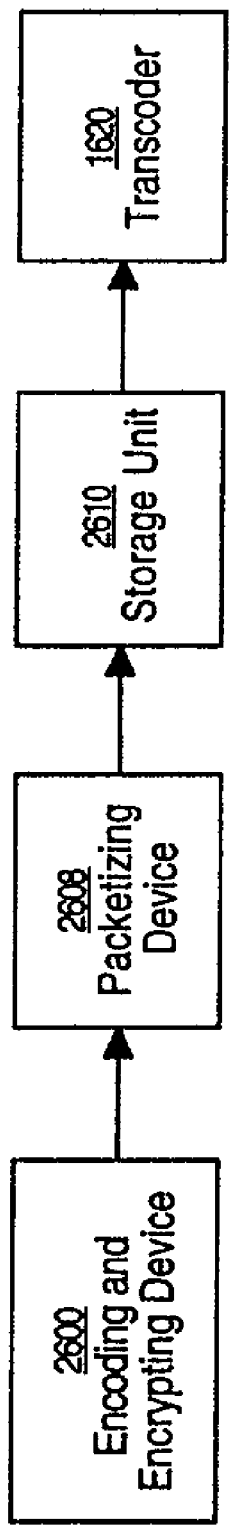

FIG. 26B illustrates an embodiment similar to that described by FIG. 26A; however, in the embodiment of FIG. 26B, encoding/encrypting and packetization are performed by separate devices (encoding and encrypting device 2600 and packetizing device 2608, respectively). Note that, in an alternative embodiment, transcoder 1620 can receive data directly from packetizing device 2608, bypassing storage unit 2610.

Figure 26C:
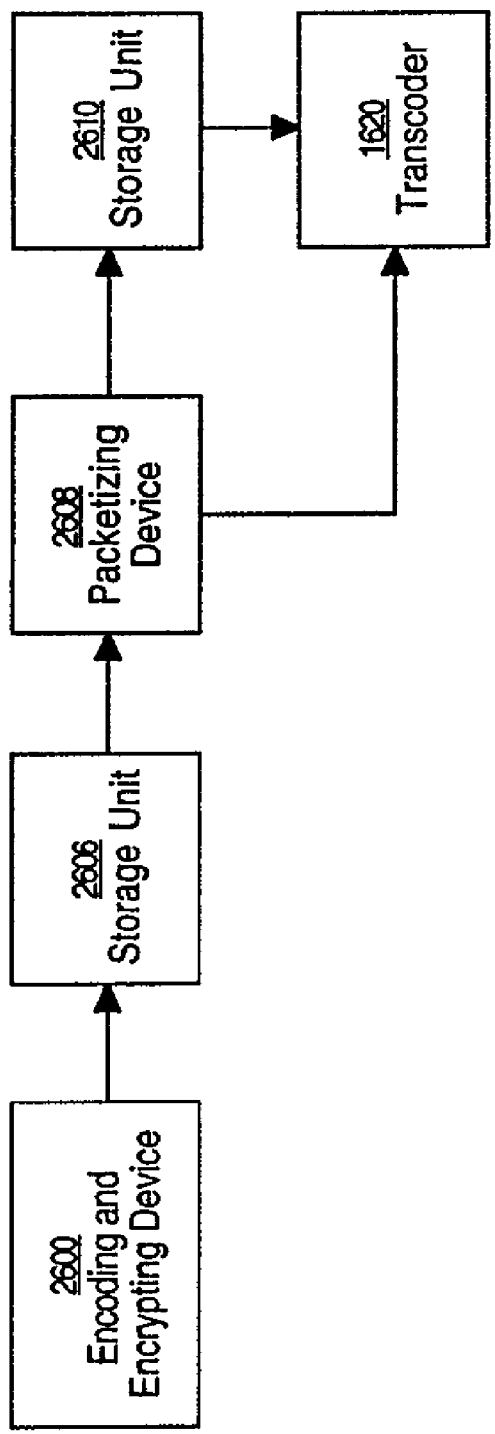
Figure 26D:
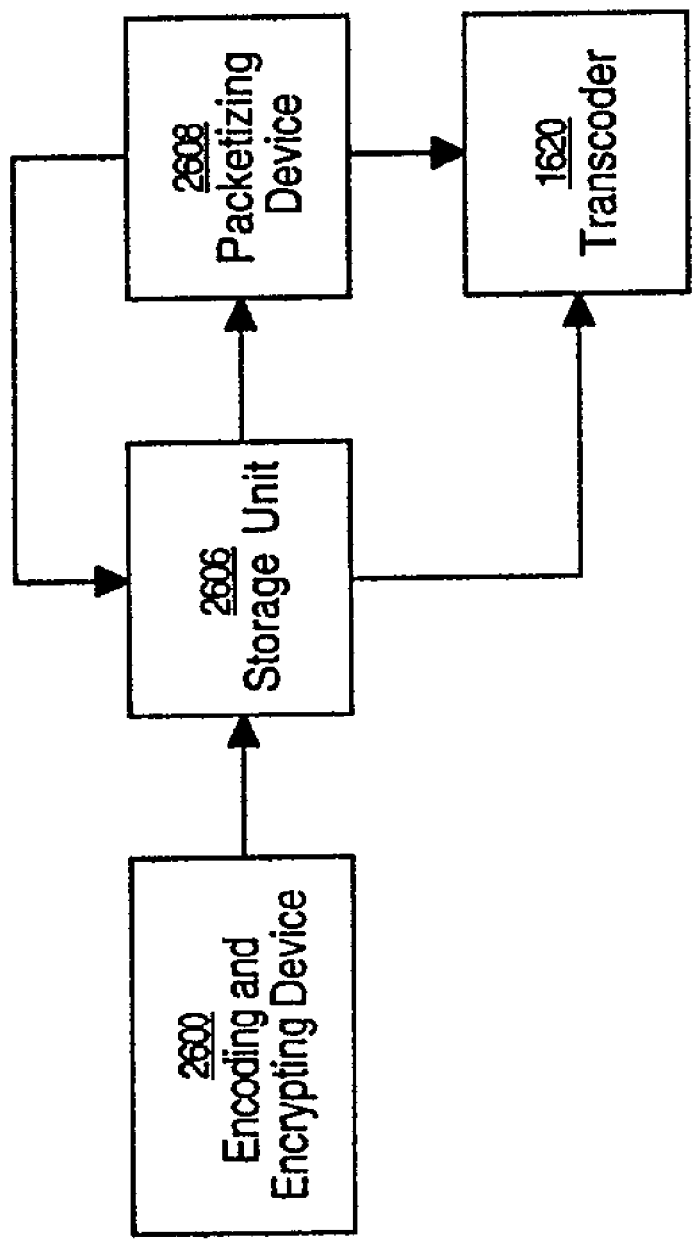

FIG. 26C illustrates an embodiment similar to that described by FIG. 26B, in which encoding/encrypting and packetization are performed by separate devices. However, in the embodiment of FIG. 26C, scalably encoded and progressively encrypted data that are output from encoding and encrypting device 2600 are stored in a storage unit 2606 disposed between encoding and encrypting device 2600 and packetizing device 2608. Thus, in this embodiment, scalably encoded progressively encrypted data are stored prior to packetization. Packetizing device 2608 can extract all of or a portion of the data in storage unit 2606, depending on the capabilities and attributes of downstream channels and devices, for example. Secure and scalable data packets that are output from packetizing device 2608 can be provided directly to transcoder 1620, or stored in a storage unit 2610 disposed between packetizing device 2608 and transcoder 1620. Alternatively, the secure and scalable data packets that are output from packetizing device 2608 can be written back to storage unit 2606, as illustrated in FIG. 26D. In these latter embodiments, transcoder 1620 can extract all of or a portion of the data stored in storage unit 2606 or 2610, depending on the attributes of a downstream receiving node, for example.

Figure 26E:
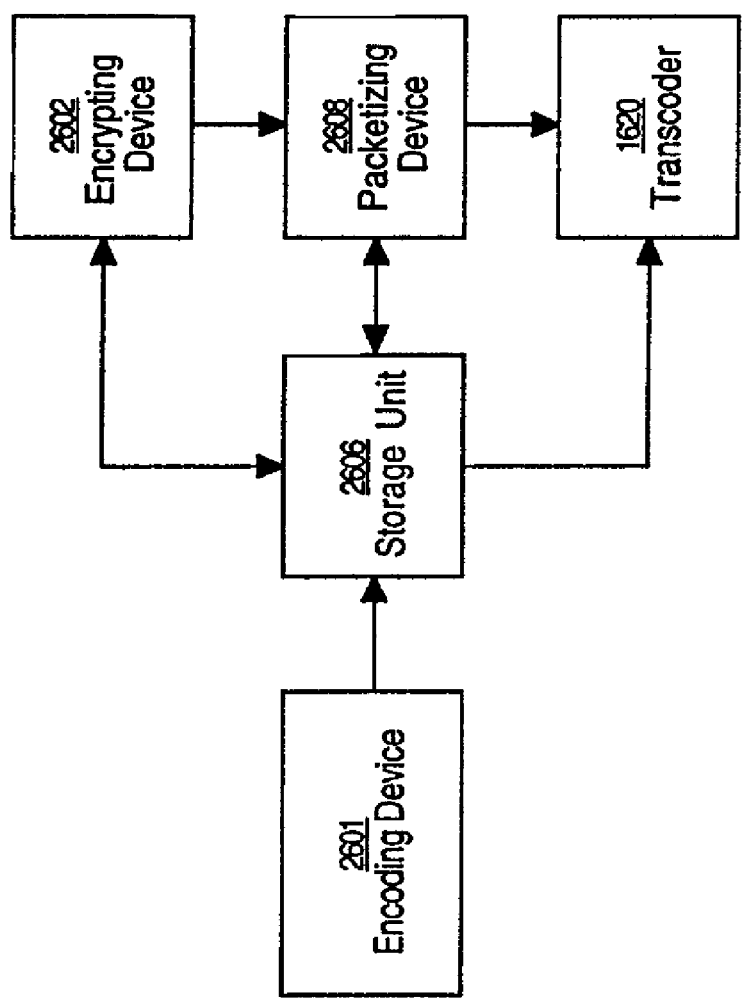

FIG. 26E illustrates an embodiment similar to that of FIG. 26D, but in which the data are scalably encoded by encoding device 2601, and the scalably encoded data are then stored in storage unit 2606. A separate device (encrypting device 2602) receives the scalably encoded data from storage unit 2606 and progressively encrypts the data. The progressively encrypted data can then be returned to storage unit 2606 or provided to packetizer 2608. After packetizing, the data can be returned to storage unit 2606 or provided to transcoder 1620. It is appreciated that the functions of one or more of the elements shown in FIG. 26E can be combined into a single device.

Figure 26F:
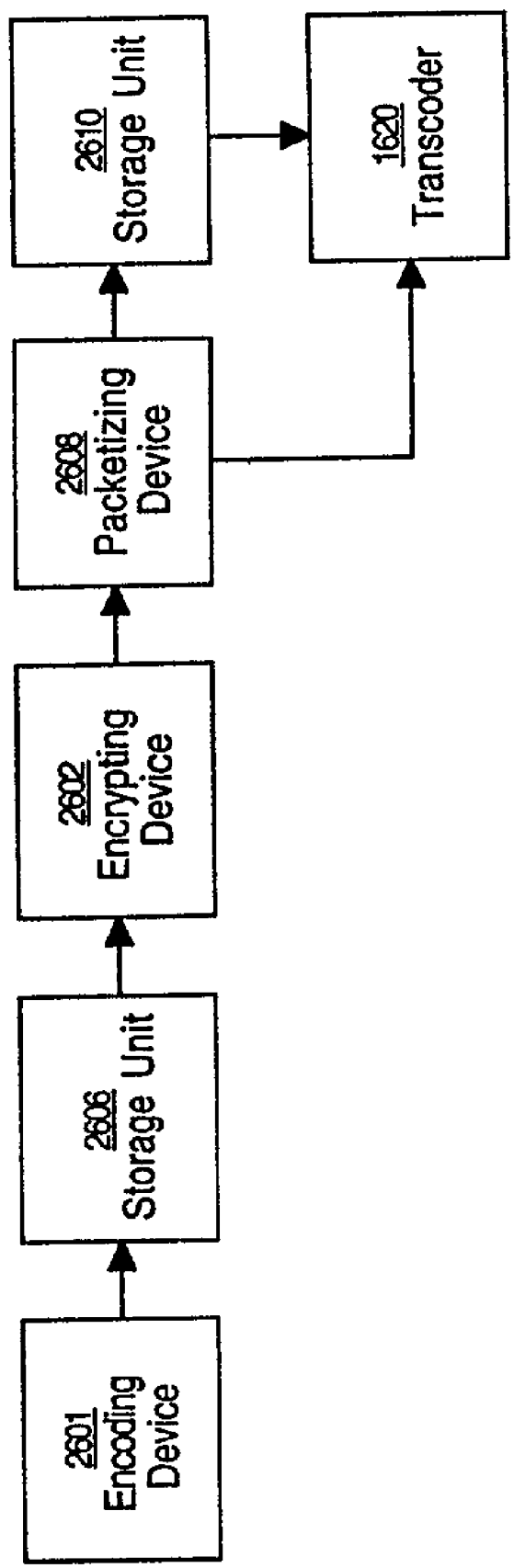

FIG. 26F illustrates an embodiment similar to that of FIG. 26E, but in which the data are scalably encoded by encoding device 2601, and the scalably encoded data are then stored in storage unit 2606. A separate device (encrypting device 2602) receives the scalably encoded data from storage unit 2606 and progressively encrypts the data. Additional processing of the scalably encoded and progressively encrypted data is then performed as described above.

Figure 27:
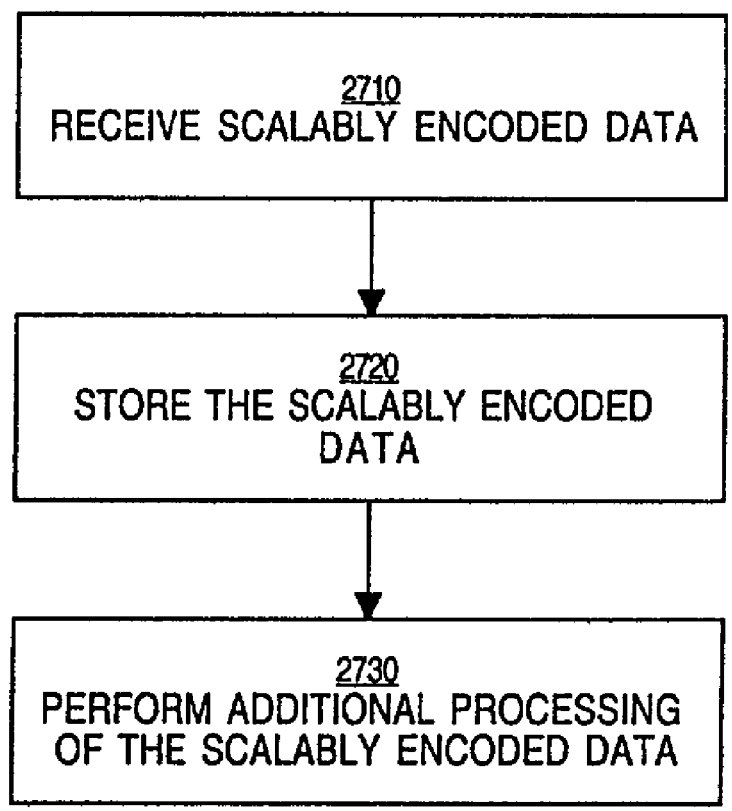
FIG. 27 is a flowchart of the steps in a process for processing and storing data in accordance with various embodiments of the present claimed invention.

FIG. 27 is a flowchart of a process 2700 for processing and storing data in accordance with various embodiments of the present claimed invention. Although specific steps are illustrated in FIG. 27, such steps are exemplary, and the present invention is well suited to performing various other steps or variations of the steps included in process 2700.

In step 2710, in one embodiment, scalably encoded data are received from a first device (e.g., encoding device 2601 of FIGS. 26E or 26F). In one embodiment, the scalably encoded data are also progressively encrypted (e.g., the data are received from encoding and encrypting device 2600 of FIGS. 26C or 26D). In yet another embodiment, the scalably encoded progressively encrypted data are packetized into secure and scalable data packets. In this latter embodiment, secure and scalable data packets are received from a first device such as encoder system 700 (FIG. 26A) or packetizing device 2608 (FIG. 26B).

In step 2720 of FIG. 27, the data received in step 2710 are stored. In one embodiment, scalably encoded data are stored (as in the embodiments of FIGS. 26E and 26F). In one embodiment, scalably encoded progressively encrypted data are stored (e.g., as in the embodiments of FIGS. 26C and 26D). In another embodiment, secure and scalable data packets are stored (e.g., as in the embodiments of FIGS. 26A and 26B).

In step 2730 of FIG. 27, the data stored in step 2720 are extracted and streamed to a downstream device for additional processing. In various embodiments, the additional processing may include packetizing and/or transcoding of the stored data. For example, in the embodiments of FIGS. 26A and 26B, the additional processing includes transcoding of the data. In the embodiment of FIGS. 26C and 26D, the additional processing includes packetizing and transcoding of the data, and perhaps storage of the data subsequent to packetizing and prior to transcoding. In the embodiments of FIGS. 26E and 26F, the additional processing can include encrypting, packetizing and transcoding of the data, and perhaps storage of the data between processing steps.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for streaming data over a network, said method comprising:
   a) receiving from a first device scalably encoded and progressively encrypted data; and
   b) storing said scalably encoded and progressively encrypted data received from said first device, wherein said scalably encoded and progressively encrypted data are subsequently streamed to a second device in said network for additional processing, wherein said additional processing comprises packetizing said progressively encrypted and scalably encoded data, wherein said packetizing generates secure and scalable data packets, wherein said additional processing further comprises storing said secure and scalable data packets in said second device, and wherein also said additional processing comprises transcoding said secure and scalable data packets according to attributes of a downstream device, wherein said transcoding is performed without decrypting said secure and scalable data packets.

2. The method as recited in claim 1 wherein said data are selected from the group consisting of: video data, audio data, image data, graphic data, and web page data.

3. The method as recited in claim 1 wherein said network comprises elements of a wireless network.

4. The method as recited in claim 1 wherein said network comprises elements of a wired network.

5. A method for streaming data over a network, said method comprising:
   a) receiving from a first device scalably encoded and progressively encrypted data, wherein said scalably encoded and progressively encrypted data received from said first device are packetized into secure and scalable data packets; and
   b) storing said secure and scalable data packets received from said first device, wherein said secure and scalable data packets are subsequently streamed to a second device in said network for additional processing, wherein said additional processing comprises transcoding said secure and scalable data packets according to attributes of a downstream device, wherein said transcoding is performed without decrypting said secure and scalable data packets.

6. The method as recited in claim 5 wherein said additional processing further comprises storing said secure and scalable data packets in said second device.

7. The method as recited in claim 5 wherein said data are selected from the group consisting of: video data, audio data, image data, graphic data, and web page data.

8. The method as recited in claim 5 wherein said network comprises elements of a wireless network.

9. The method as recited in claim 5 wherein said network comprises elements of a wired network.

10. A method for streaming data over a network, said method comprising:
    a) receiving from a first device scalably encoded data; and
    b) storing said scalably encoded data, wherein said scalably encoded data are subsequently streamed to a device in said network for additional processing, wherein said additional processing comprises progressively encrypting said scalably encoded data and packetizing progressively encrypted and scalably encoded data, wherein said packetizing generates secure and scalable data packets, wherein said additional processing further comprises storing said secure and scalable data packets in a second device in said network, and wherein also additional processing comprises transcoding said secure and scalable data packets according to attributes of a downstream device, wherein said transcoding is performed without decrypting said secure and scalable data packets.

11. The method as recited in claim 10 wherein said data are selected from the group consisting of: video data, audio data, image data, graphic data, and web page data.

12. The method as recited in claim 10 wherein said network comprises elements of a wireless network.

13. The method as recited in claim 10 wherein said network comprises elements of a wired network.

* * * * *